United States Patent
Kawamura et al.

(10) Patent No.: US 7,936,658 B2
(45) Date of Patent: *May 3, 2011

(54) PHOTODETECTOR, DIFFRACTION GRATING, OPTICAL PICKUP AND OPTICAL DISC APPARATUS

(75) Inventors: Tomoto Kawamura, Tokyo (JP);
Kunikazu Ohnishi, Yokosuka (JP);
Masayuki Inoue, Yokohama (JP);
Katsuhiko Izumi, Kamakura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,613

(22) Filed: Feb. 22, 2010

(65) Prior Publication Data

US 2010/0148045 A1    Jun. 17, 2010

Related U.S. Application Data

(63) Continuation of application No. 11/369,077, filed on Mar. 7, 2006, now Pat. No. 7,706,220.

(30) Foreign Application Priority Data

Jul. 25, 2005  (JP) .................................. 2005-213606
Feb. 22, 2006  (JP) .................................. 2006-044644

(51) Int. Cl.
*G11B 7/00* (2006.01)
(52) U.S. Cl. .................. 369/112.07; 369/44.37; 369/120
(58) Field of Classification Search .............. 369/44.37, 369/44.41, 44.42, 94, 112.05, 112.06, 112.07, 369/120
See application file for complete search history.

(56) References Cited

U.S. PATENT DOCUMENTS

| | | | |
|---|---|---|---|
| 6,084,843 A | 7/2000 | Abe et al. | |
| 6,567,355 B2 | 5/2003 | Izumi et al. | |
| 6,680,894 B2 | 1/2004 | Hayashi et al. | |
| 6,967,907 B2 | 11/2005 | Yukawa | |
| 6,980,504 B2 | 12/2005 | Yukawa | |

(Continued)

FOREIGN PATENT DOCUMENTS

JP    9-306020    11/1997

(Continued)

OTHER PUBLICATIONS

U.S. Appl. No. 11/369,077, filed Mar. 7, 2006, Tomoto Kawamura et al., Hitachi Medical Electronics Co., Ltd.

(Continued)

*Primary Examiner* — Thang V Tran
(74) *Attorney, Agent, or Firm* — Antonelli, Terry, Stout & Kraus, LLP.

(57) ABSTRACT

The present invention provides a photodetector capable of generating highly accurate tracking and focusing error signals free of variations in light quantity caused by interference, in an optical pickup with a two-wavelength multilaser. The photodetector comprises first three light receiving areas arranged linearly to receive three light beams respectively resulting from splitting of a light beam emitted from a laser light source of a first wavelength and second three light receiving areas arranged linearly to receive three light beams respectively resulting from splitting of a light beam emitted from a laser light source of a second wavelength longer than the first wavelength. The distance between both-end light receiving areas out of the first three light receiving areas is longer than the distance between both-end light receiving areas out of the second three light receiving areas.

11 Claims, 19 Drawing Sheets

U.S. PATENT DOCUMENTS

| | | |
|---|---|---|
| 7,190,657 B2 | 3/2007 | Shin et al. |
| 7,369,466 B2 * | 5/2008 | Heor .......................... 369/44.37 |
| 7,480,228 B2 * | 1/2009 | Mori .......................... 369/112.07 |
| 7,706,220 B2 * | 4/2010 | Kawamura et al. ......... 369/44.37 |
| 2003/0179680 A1 * | 9/2003 | Park et al. ................. 369/112.04 |
| 2005/0007932 A1 | 1/2005 | Ishika |
| 2007/0127349 A1 | 6/2007 | Hotta et al. |

FOREIGN PATENT DOCUMENTS

| | | |
|---|---|---|
| JP | 2001-216677 | 8/2001 |
| JP | 2003-162831 | 6/2003 |
| JP | 2003-272218 | 9/2003 |
| JP | 2005-085369 | 3/2005 |
| JP | 2007-164962 | 6/2007 |

OTHER PUBLICATIONS

Office Action issued in Japanese Patent Application No. 2006-044644 on Aug. 17, 2010.

* cited by examiner

DVD-GRATING

CD-GRATING

DVD-R

CD-R

DVD-GRATING

CD-GRATING

AREA C (WIDTH A)

WHEN EFFECTIVE
DIAMETER OF INCIDENT
LIGHT BERM IS SMALL

AREA C (WIDTH B)

WIDTH A < WIDTH B

WHEN EFFECTIVE
DIAMETER OF INCIDENT
LIGHT BERM IS LARGE

PHOTODETECTOR, DIFFRACTION GRATING, OPTICAL PICKUP AND OPTICAL DISC APPARATUS

CLAIM OF PRIORITY

This application is a continuation of application Ser. No. 11/369,077, filed on Mar. 7, 2006, now U.S. Pat. No. 7,706,220, which claims the benefit of Japanese applications Serial No. JP 2005-213606, filed on Jul. 25, 2005 and Serial No. JP 2006-044644, filed on Feb. 22, 2006, the contents of which are hereby incorporated by references into this application.

BACKGROUND OF THE INVENTION

The present invention relates to a photodetector for use in read or write of an optical disc, a diffraction grating, an optical pickup, and an optical disc apparatus.

An optical pickup has been heretofore known that carries a two-wavelength multilaser thereon and uses a DPP method for generation of a tracking error signal and an astigmatic method for generation of a focusing error signal. In such an optical pickup, detection area patterns in a photodetector are formed in 3 rows×2 columns and a tracking error signal and a focusing error signal are generated in accordance with signals provided from the detection areas. See, for example, Patent Literature 1 (Japanese Patent Laid-open No. 2003-272218).

A technique is also known which simplifies the detection area patterns of 3 rows×2 columns described in Patent Literature 1 to reduce the cost of the photodetector. See, for example, Patent Literature 2 (Japanese Patent Laid-open No. 2005-85369).

SUMMARY OF THE INVENTION

However, in a case of using the two-wavelength multilaser light source, since the respective optical paths of a DVD and a CD are almost coincident with each other, not only a light beam of the DVD but also a light beam of the CD is incident on a diffraction grating dedicated to a DVD and likewise not only a light beam of the CD but also a light beam of the DVD is incident on a diffraction grating dedicated to the CD. As a result, for example from the light beam of the DVD, a sub-light beam 1 is generated by the diffraction grating dedicated to the DVD and a sub-light beam 2 by the diffraction grating dedicated to the CD. In this case, the sub-light beam 1 is used for tracking control, whereas the sub-light beam 2 becomes an extra disturbance component. That is, the extra disturbance component generated when light beams passes through the respective diffraction gratings is likely to enter the respective photodetectors for the DVD and CD and be added as an extra signal component.

If an overlapping area of both sub-light beams 1 and 2 are created on the photodetector, the sub-light beams 1 and 2 interfere with each other even upon a slight change in optical path length in the overlapping area. Therefore, if there occurs for example tilting of the disc or an axial deviation, the amount of light detected in each photodetector varies greatly, which causes a variation of the tracking error signal and focusing error signal and thus making a stable position control difficult. Consequently, it may become impossible to effect read and write in a satisfactory manner.

These problems are found also in Patent Literatures 1 and 2. For example, according to the technique described in Patent Literature 1, as shown in FIG. 14, not only the original sub-light beam 1 but also the sub-light beam 2 overlaps in the detection areas for a DVD (the left-hand detection areas out of the detection areas of 3 rows×2 columns). This is also the case with the detection areas for a CD (the right-hand detection areas out of the detection areas of 3 rows×2 columns).

Further, according to the technique described in Patent Literature 2, as shown in FIG. 2B, 050 and 051 are generated as light beams 2 from a DVD optical beam by the diffraction grating dedicated to CD and 052 and 053 are generated as light beams 2 from a CD optical beam by the diffraction grating dedicated to a DVD. As a result, the overlapping areas of the sub-light beam 2 are created in addition to the original sub-light beam 1.

The present invention has been accomplished in view of the above-mentioned problem and it is an object of the invention to provide a photodetector, a diffraction grating, an optical pick up and an optical disc apparatus that permit stable read or write operation of an optical information recording medium.

In order to achieve the above-mentioned object, the photodetector according to the present invention includes a first light receiving area adapted to receive a light beam emitted from a laser light source of a first wavelength and split by first and second diffraction gratings and a second light receiving area adapted to receive a light beam emitted from a laser light source of a second wavelength longer than the first wavelength and split by the first and second diffraction gratings. The first light receiving area is disposed at a position where, when a light beam is emitted from the laser light source of the first wavelength, the light beam split by the first diffraction grating enters the first light receiving area and the light beam split by the second diffraction grating does not enter the first light receiving area. The second light receiving area is disposed at a position where, when a light beam is emitted from the laser light source of the second wavelength, the light beam split by the first diffraction grating does not enter the second light receiving area and the light beam split by the second diffraction grating enters the second light receiving area.

The diffraction grating according to the present invention includes a first grating pattern for splitting a light beam emitted from a laser light source of a first wavelength into at least three light beams and a second grating pattern for splitting a light beam emitted from a laser light source of a second wavelength longer than the first wavelength into at least three light beams. The width of a grating groove in the first grating pattern and that of a grating groove in the second grating pattern are made different from each other.

The optical pickup according to the present invention includes a first laser light source for emitting a light beam of a first wavelength, a second laser light source for emitting a light beam of a second wavelength longer than the first wavelength, the above diffraction grating for splitting the light beam emitted from the first or the second laser light source into at least three light beams, an objective lens for condensing a light beam onto an optical information recording medium, and the above photodetector which receives light reflected from the optical information recording medium.

The optical disc apparatus according to the present invention includes the above optical pickup, an information input section for inputting an information signal, and a recording signal generating section for generating a signal to be recorded to the optical information recording medium from the information inputted from the information input section and outputting it to the optical pickup.

According to the present invention it is possible to provide the photodetector, diffraction grating, optical pickup and optical disc apparatus all capable of effecting stable read or write operation of an optical information recording medium.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

An optical disc permitting read or write operation of a DVD (Digital Versatile Disc) and a CD (Compact Disc), as well as an optical pickup mounted on the optical disc, a photodetector mounted on the optical pickup, and a diffraction grating, will be described in the following embodiments of the present invention by way of example.

The present invention will be described in detail by way of the following embodiments, provided the invention is not limited thereby.

First Embodiment

A first embodiment of the present invention will now be described in detail with reference to FIG. 1. A photodetector according to the first embodiment will here be described.

Figure 1:
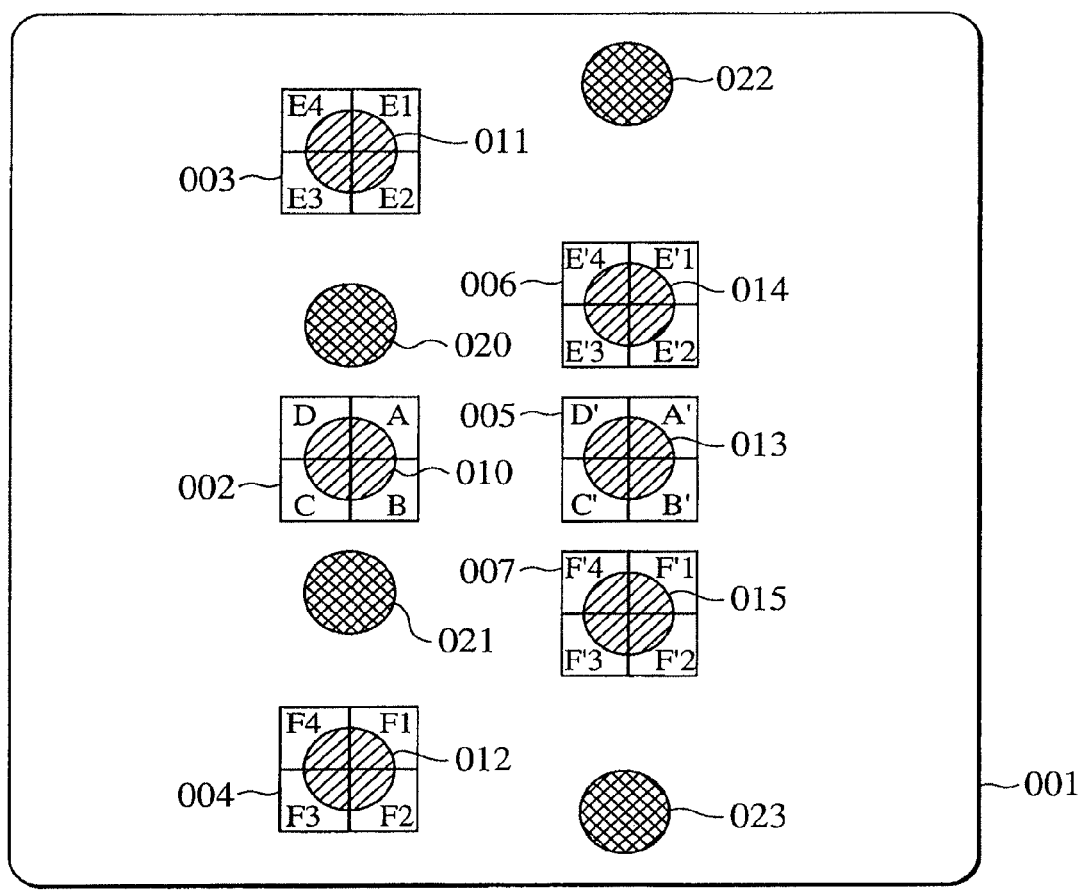
FIG. 1 illustrates an optical detector according to a first embodiment of the present invention.

FIG. 1 illustrates the photodetector of the first embodiment. In the photodetector, indicated at 001, there are six detection areas 002, 003, 004, 005, 006 and 007. Each detection area is divided in four. More specifically, the detection area 002 has detection surfaces A, B, C, D, the detection area 003 has detection surfaces E1, E2, E3, E4, the detection area 004 has detection surfaces F1, F2, F3, F4, the detection area 005 has detection surfaces A', B', C', D', the detection area 006 has detection surfaces E'1, E'2, E'3, E'4, and the detection area 007 has detection surfaces F'1, F'2, F'3, F'4.

The detection areas 002, 003 and 004 receive DVD light beams. More specifically, the detection area 002 receive a DVD main light beam and the detection areas 003 and 004 receive DVD sub-light beams 011 and 012, respectively.

The detection areas 005, 006 and 007 receive CD light beams. More specifically, the detection area 005 receives a CD main light beam and the detection areas 006 and 007 receive CD sub-light beams 014 and 015, respectively.

It is assumed that a DVD and a CD adopt a differential astigmatic method for generation of a focusing error signal and DPP for generation of a tracking error signal. A detailed description of the differential astigmatic method will here be omitted because of a known technique. The signals detected from the photodetector 001 include a total main light beam quantity, as well as a focusing error signal and a tracking error signal, in each of DVD and CD optical systems. It is possible to obtain the detected signals in accordance with the following arithmetic expressions (1) to (6):

$$\text{DVD total main light beam quantity} = A+B+C+D \quad (1)$$

$$\text{CD total main light beam quantity} = A'+B'+C'+D' \quad (2)$$

$$\text{DVD focusing error signal} = [(A+C)-(B+D)]+k\times\{[(E1+E3)-(E2+E4)]+[(F1+F3)-(F2+F4)]\} \quad (3)$$

$$\text{CD focusing error signal} = [(A'+C')-(B'+D')]+k'\times\{[(E'1+E'3)-(E'2+E'4)]+[(F'1+F'3)-(F'2+F'4)]\} \quad (4)$$

$$\text{DVD tracking error signal} = [(A+D)-(B+C)]-k\times\{[(E1+E4)-(E2+E3)]+[(F1+F4)-(F2+F3)]\} \quad (5)$$

$$\text{CD tracking error signal} = [(A'+D')-(B'+C')]-k'\times\{[(E'1+E'4)-(E'2+E'3)]+[(F'1+F'4)-(F'2+F'3)]\} \quad (6)$$

In the above expressions, k and k' represent coefficients for correction of an optical quantity ratio between main and sub-light beams.

In a case of using a two-wavelength multilaser and adopting DPP for generation of a tracking error signal, it is necessary that such detection areas of 3 rows×2 columns as shown in FIG. 1 be provided. This is because a DVD light beam emitting point position and a CD light beam emitting point position are different from each other and therefore two columns of detection areas are needed and further because sub-light beams are needed for generation of tracking error signals by DPP in both a DVD and a CD.

DPP uses diffraction gratings for generation of main and sub-light beams. Since the guide groove spacing is different between a DVD and a CD, optimal irradiation positions of main and sub-light beams on disc are different between DVD and CD. Therefore, it is necessary that a diffraction grating used in DVD and that used in CD be different in grating pattern from each other.

In a case of using the two-wavelength multilaser, optical paths in a DVD and a DC are almost coincident with each other. Therefore, it is inevitably required that diffraction gratings be disposed on the same optical path in both a DVD and a CD.

That is, not only DVD light beams but also CD light beams are incident on the diffraction grating dedicated to a DVD, likewise, not only CD light beams but also DVD light beams are incident on the diffraction grating dedicated to a CD. As a result, from the DVD light beams, DVD sub-light beams 011 and 012 are generated by the diffraction grating dedicated to the DVD and disturbance light beams 020 and 021 are generated by the diffraction grating dedicated to the CD. Further, from the CD light beams, CD sub-light beams 014 and 015 are generated by the diffraction grating dedicated to CD and disturbance light beams 022 and 23 are generated by the diffraction grating dedicated to the DVD.

If such disturbance light beams overlap for example sub-light beams on the photodetector, the resulting interference acts as a cause of a great variation of tracking and focusing error signals. To avoid such a variation, the photodetector of this embodiment is constructed so as to prevent main and sub-light beams from overlapping the disturbance light beams on the photodetector.

In this embodiment, the photodetector includes DVD light beam receiving detection areas 002, 003 and 004 arranged in one column at predetermined intervals and CD light beam receiving detection areas 005, 006 and 007 arranged next to the detection areas 002, 003 and 004 in one column at predetermined intervals. In the photodetector thus constructed, the spacing of the three detection areas 002, 003, 004 and that of the three detection areas 005, 006, 007 are made different from each other.

More specifically, the detection areas 002, 003 and 004 are arranged at respective positions where, when a light beam is emitted from the laser light source for a DVD, light beams 011 and 012 split by the diffraction grating for a DVD enter and light beams 020 and 021 split by the diffraction grating for a CD do not enter.

That is, according to the layout in question, DVD light beams diffracted by the diffraction grating for CD are directed outside the detection areas 002 to 004, more specifically, directed to the area between the detection areas 002 and 003 and the area between the detection areas 002 and 004, while CD light beams diffracted by the diffraction grating for DVD are directed outside the detection areas 013 to 015. For incidence of light beams as in FIG. 1 it is necessary to improve the structure of the diffraction gratings, but a description on this point will be given later.

In the photodetector of this embodiment, the spacing of the three detection areas 005, 006 and 007 for CD light beams longer in wavelength than DVD light beams is made small.

Figure 2A:
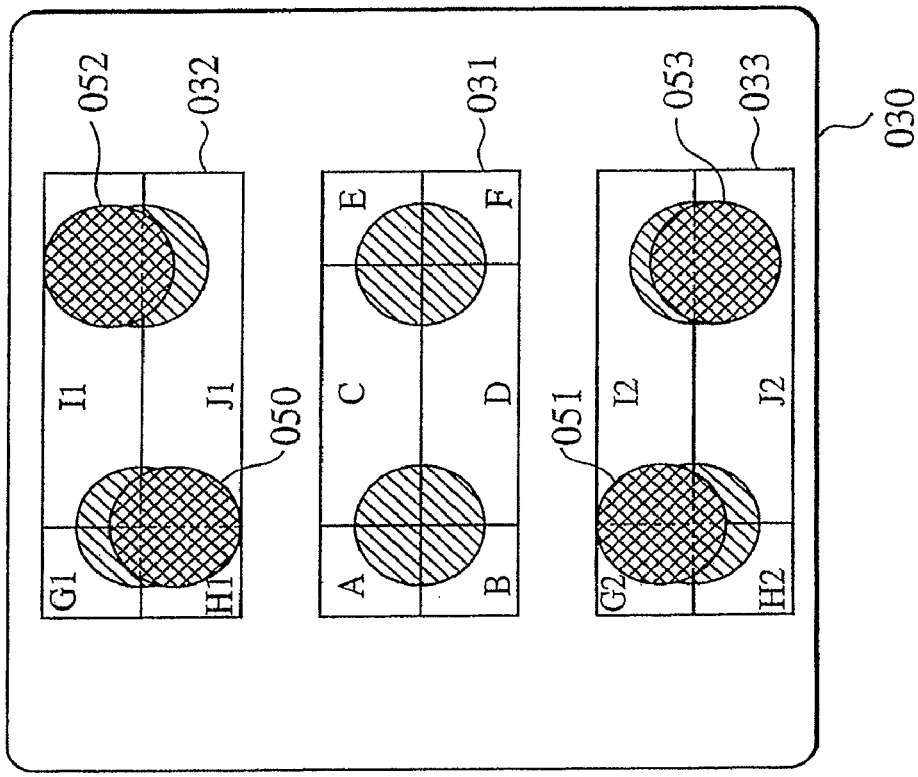
FIGS. 2A and 2B illustrate a conventional photodetector.
Figure 2B:
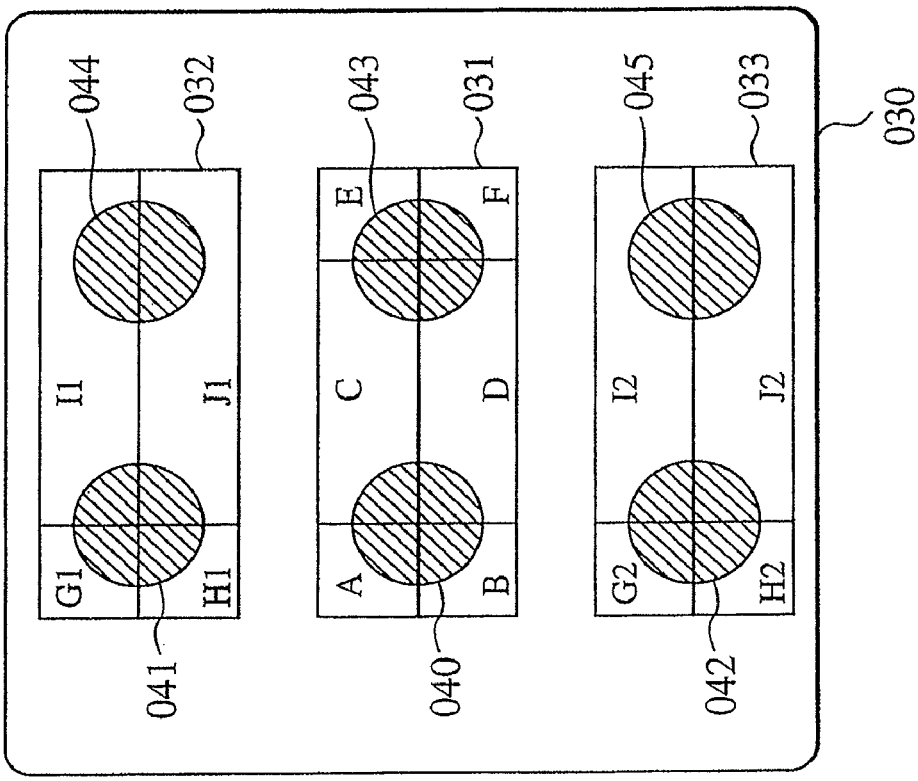

FIGS. 2A and 2B illustrate the conventional photodetector described in Patent Literature 2. More particularly, FIG. 2A illustrates a layout of light spots on a photodetector 030 in a case of using an ideal diffraction grating, while FIG. 2B illustrates a layout of light spots on the photodetector 030 in a case of using an actual diffraction grating.

A description will be given below first in connection with FIG. 2A.

The photodetector 030 is composed of three detection areas 031, 032 and 033. The detection area 031 has detection surfaces A, B, C, D, E and F, the detection area 032 has detection surfaces G1, H1, I1 and J1, and the detection area 033 has detection surfaces G2, H2, I2 and J2.

The detection area 031 receives a DVD main light beam 040 and a CD main light beam 043, and the detection areas 032 and 033 receive a DVD sub-light beam 041 and a CD sub-light beam 044, and a DVD sub-light beam 042 and a CD sub-light beam 045, respectively.

In comparison with the photodetector 001 the photodetector 030 is constructed to have the number of detection areas subtracted three from six.

It is assumed that the photodetector 030 adopts a differential astigmatic method for generation of a focusing error signal and DPP for generation of a tracking error signal for a DVD, while adopting an astigmatic method for generation of a focusing error signal and DPP for generation of a tracking error signal for a CD. Therefore, the detection areas 032 and 033 are each divided in four for only DVD sub-light beams and is divided in two for CD sub-light beams.

Using a two-wavelength multilaser and adopting DPP for generation of a tracking error signal may cause a disturbance light beam as noted earlier. Therefore, as shown in FIG. 2B, disturbance light beams 050 and 051 are generated from the DVD light beam by a diffraction grating dedicated to a CD and disturbance light beams 052 and 053 are generated from the CD light beam by a diffraction grating dedicated to a DVD.

Areas where such disturbance light beams overlap sub-light beams are created. For example, it is seen that an area is created where the DVD sub-light beam 041 and the disturbance light beam 050 overlap each other. Once light beams thus overlap each other on the photodetector, the quantity of light varies greatly due to interference. This causes a great variation of tracking and focusing error signals which utilize detected signals based on sub-light beams, thus making it impossible to effect a stable position controlling operation.

Since the light beam of a DVD (660 nm) is shorter in wavelength than that of a CD (785 nm), the disturbance light beams 050 and 051 become slightly smaller in diffraction angle than the DVD sub-light beams 041 and 042.

If light intensities of two light beams are assumed to be $a^2$ and $b^2$, there is established a relation such that a light quantity I corresponding to an interference variation of the two light beams is expressed by the following equation (7):

$$I = a^2 + b^2 + 2ab \cos(k\sigma) \tag{7}$$

where k stands for the number of waves and σ stands for a difference in optical path length between two light beams.

In the actual diffraction grating, a disturbance light beam is generated only slightly. For example, in the case where the quantity of light incidence on the diffraction grating is 100, it is assumed that 91 main light beams, 8 sub-light beams and only 1 disturbance light beam are generated. The disturbance light beam is only about 1% relative to the main light beam, but is about 10% relative to the sub-light beams. If this relation is applied to the equation (7) ($a^2=8$, $b^2=1$), it follows that the quantity of light I varies a maximum of about 15 and a minimum of about 3 in consideration of the worst variation in optical path length. That is, the light quantity of sub-light beams decreases or increases 50% due to interference, thus making it difficult to generate stable focusing and tracking error signals.

Since in this first embodiment the use of the differential astigmatic method is assumed for generation of a focusing error signal, the detection areas 003, 004, 006 and 007 are each divided in four. In a case of adopting an astigmatic method using only main light beams, however, a mere vertical division in two will do. For example, there may be adopted a construction wherein E1 and E4, and E2 and E3, are not divided.

In the photodetector 001, the detection areas 002 and 005 for receiving DVD main light beam 010 and CD main light beam 013 respectively are each divided in four and DPD may be adopted for generation of a tracking error signal when a DVD-ROM and a CD-ROM are read.

Second Embodiment

In this second embodiment a description will be given of a two-wavelength multilaser-carrying optical pickup to accommodate an optical disc apparatus capable of writing and reading a DVD and a CD.

Figure 3:
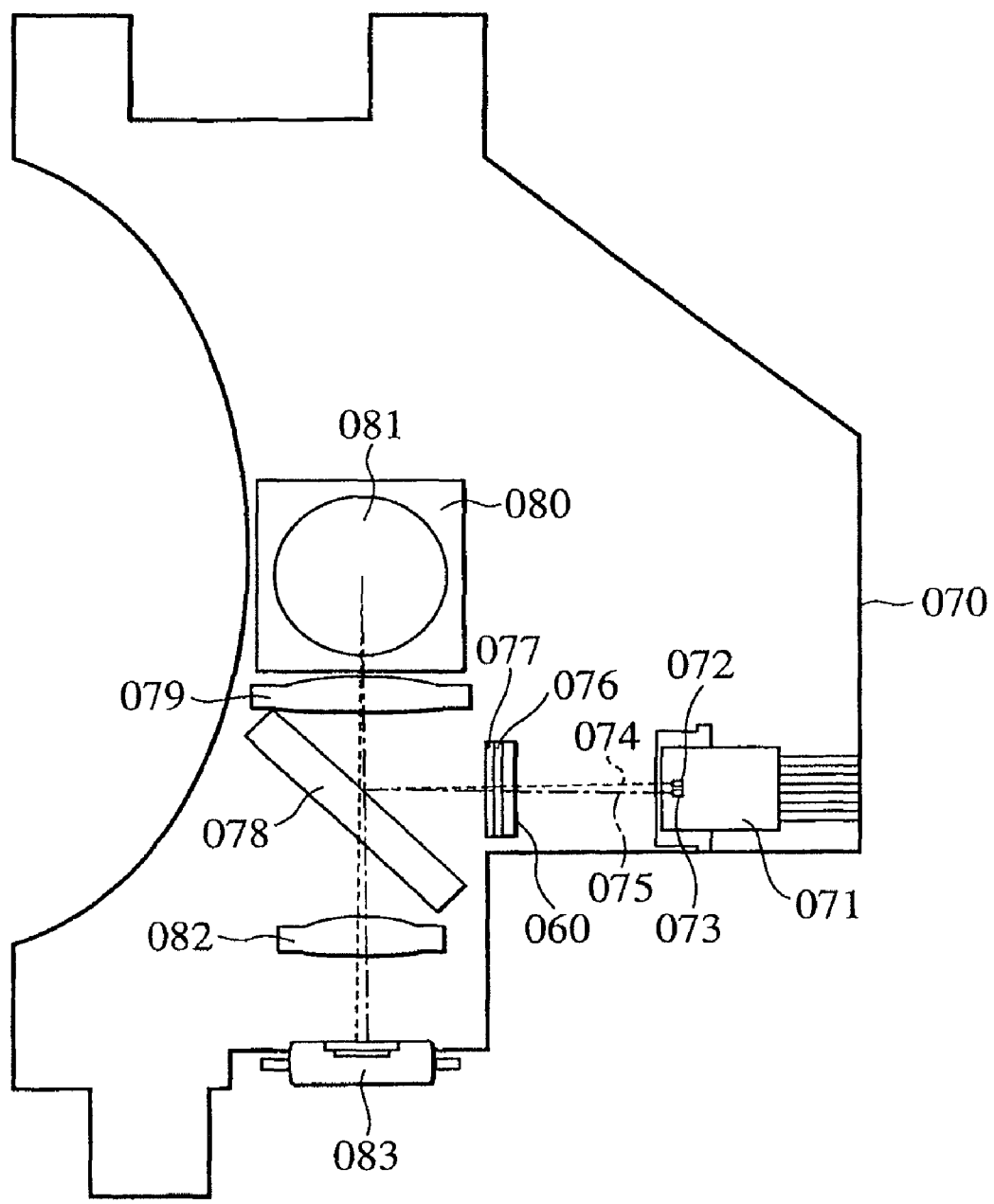
FIG. 3 illustrates a schematic construction of an optical pickup according to a second embodiment of the present invention.

FIG. 3 illustrates the construction of an optical system in an optical pickup 070. A semiconductor laser of a wavelength of about 660 nm is commonly employed to read or write data from or to a DVD type optical disc. A semiconductor laser of a wavelength of about 785 nm is commonly employed to read or write data from or to a CD type optical disc. A two-wavelength multilaser 071 is a laser light source carrying two laser chips thereon which are a DVD laser chip 072 adapted to emit a light beam with a wavelength of about 660 nm for a DVD and a CD laser chip 073 adapted to emit a light beam with a wavelength of about 785 nm for a CD.

Reference will first be made to the DVD optical system. A DVD light beam is emitted as divergent light from the DVD laser chip 072 which is provided within the two-wavelength multilaser 071. A dotted line 074 in the figure represents an optical path of the DVD light beam. The DVD light beam emitted from the DVD laser chip 072 is incident on a diffraction grating 060.

The diffraction grating 060 has a function of splitting a light beam into three. The three light beams are used for generation of a tracking error signal by DPP and a focusing error signal by the differential astigmatic method. The diffraction grating 60 is a lamination of both diffraction grating dedicated to a DVD and diffraction grating dedicated to a CD, including a DVD grating pattern 076 as the diffraction grating dedicated to a DVD and a CD grating pattern 077 as the diffraction grating dedicated to a CD.

With this arrangement, the DVD light beam incident on the diffraction grating 060 is split by the DVD grating pattern 076 into three light beams best suited to generation of a tracking error signal by DPP in a DVD. The DVD light beam which has passed through the DVD grating pattern 076 then passes through the CD grating pattern 077. The CD grating pattern 077 actually generates a slight disturbance light beam even if the groove depth and duty ratio are set so as to permit 100% transmittance of the DVD light beam ideally.

The DVD light beam which has passed through the CD grating pattern 077 is reflected by a beam splitter 078 and is directed to a collimating lens 079, whereby it is converted to a substantially parallel light beam. The DVD light beam which has passed through the collimating lens 079 is reflected in a z-direction (a direction perpendicular to the paper surface) in the figure by a reflection mirror 080 and is condensed onto an optical disc (not shown) by an objective lens 081 mounted on an actuator (not shown).

The DVD light beam is reflected by the optical disc, then passes through the objective lens 081, reflection mirror 080, collimating lens 079, beam splitter 078 and a detection lens 082 and reaches a photodetector 083. A predetermined astigmatism is imparted to the light beam when it passes through the beam splitter 078 and is used in detecting a focusing error signal of the optical disc by the differential astigmatic method. The detection lens 082 functions to not only turn the direction of astigmatism in a predetermined direction but also determine the size of a light spot on the photodetector 083. The DVD light beam which has been directed to the photodetector 083 is used in detecting an information signal recorded on the optical disc and also in detecting a position control signal for the light spot on the optical disc such as a tracking error signal or a focusing error signal.

Reference will now be made to the CD optical system. A CD light beam is emitted as divergent light from the CD laser chip 073 provided in the two-wavelength multilaser 071. A dot-dash line 075 in the figure represents an optical path of the CD light beam. The CD light beam emitted from the CD laser chip 073 is incident on the diffraction grating 060. An output angle of the CD light beam is inclined with respect to the DVD light beam. This is because the DVD laser chip 072 and the CD laser chip are spaced 110 μm from each other in an x-direction in the figure. Therefore, if an incident optical axis of the DVD light beam is assumed to be perpendicular to the center of the objective lens 081, it follows that the center of the CD light beam is inclined. The spacing 110 μm between the DVD laser chip and the CD laser chip is the spacing which laser manufacturers generally adopt in two-wavelength multilasers.

As noted above, the diffraction grating 060 has a function of splitting a light beam into three. The three light beams are used for generation of a tracking error signal by DPP and a focusing error signal by the differential astigmatic method. The CD light beam incident on the diffraction grating 060 first enters the DVD grating pattern 076. The DVD grating pattern 076 actually generates a slight disturbance light beam even if the groove depth and duty ratio are set so as to permit 100% transmittance of the CD light beam ideally. The CD light beam which has passed through the DVD grating pattern 076 is incident on the CD grating pattern 077, whereby it is split into three light beams best suited to generation of a tracking error signal by DPP in a CD.

The CD light beam which has passed through the CD grating pattern 077 is reflected by the beam splitter 078 and is directed to the collimating lens 079, whereby it is converted to a substantially parallel light beam. The CD light beam which has pass through the collimating lens 079 is reflected in a z-direction (a direction perpendicular to the paper surface) by the reflection mirror 080 and is condensed onto the optical disc (not shown) by the objective lens 081 mounted on the actuator (not shown).

The CD light beam is reflected by the optical disc, then passes through the objective lens 081, reflection mirror 080, collimating lens 079, beam splitter 078 and detection lens 082 and reaches the photodetector 083. A predetermined astigmatism is imparted to the light beam when it passes through the beam splitter 078 and is used in generating a focusing error signal by the differential astigmatic method. Also for the CD light beam the detection lens 082 functions to not only turn the direction of astigmatism in a predetermined direction but also determine the size of a light spot on the photodetector 083. The CD light beam which has been directed to the photodetector 083 is used in detecting an information signal recorded on the optical disc and also in detecting a position control signal for the light spot condensed on the optical disc such as a tracking error signal or a focusing error signal.

Since the disposed position of the CD laser chip 073 is different from that of the DVD laser chip 072, the CD light beam is condensed to a position different from that of the DVD light beam. Therefore, the optical pickup using the two-wavelength multilaser needs to use two columns of photodetectors.

Thus, in the optical pickup using the two-wavelength multilaser, since the optical path of the DVD light beam and that of the CD light beam are substantially coincident with each other, the DVD light beam inevitably passes through not only the DVD grating pattern but also the CD grating pattern. Likewise, the CD light beam inevitably passes through not only the CD grating pattern but also the DVD grating pattern. Consequently, the generation of disturbance light is unavoidable.

In the optical pickup of this embodiment, as described above in the first embodiment, a highly accurate and stable detection of both tracking error signal and focusing error signal can be effected as in the conventional optical pickup in order to avoid interference of a disturbance light beam with another light beam on the photodetector.

Although a description has been given in this second embodiment of the optical pickup applicable to an optical disc apparatus which can read and write data from and to a DVD and a CD, it goes without saying that the present invention is also applicable to optical pickups for not only a CD but also high-density optical disc apparatus (BD and HD-DVD) as the next-generation optical disc apparatus using a blue color emitted semiconductor laser.

In an information read/write apparatus using a conventional optical pick it is necessary that the quantity of a light beam to be directed to an optical disc be controlled to a constant quantity in order to effect a stable read/write processing. An optical pickup incorporates a device (generally called a front monitor) that detects the quantity of a light beam emitted from a laser light source, and the thus-detected light quantity is fed back to the laser light source thereby to exactly control the quantity of light beam to be directed to an optical disc. This has no direct bearing on this embodiment and so reference is not made hereto, but the optical pickup of this embodiment is also applicable to such an optical pickup with a front monitor disposed therein.

FIG. 2 illustrates a construction wherein DVD and CD light beams are incident at an angle of 45° on the beam splitter 078. However, the angle of incidence may be smaller than 45°, e.g., 40° or 35°. By thus making the angle of incidence smaller than 45° an effect accrues that the design of reflection/transmission film characteristics which determine a reflection/transmission performance of a DH mirror becomes easier.

Although in this embodiment both DVD and CD diffraction patterns are formed by a single diffraction grating, it goes without saying that two diffraction gratings may be disposed which are a diffraction grating dedicated to a DVD and a diffraction grating dedicated to a CD.

Third Embodiment

In accordance with a third embodiment a description will be given below of a disturbance light beam which is generated by a diffraction grating with reference to the drawings.

Figure 4A:
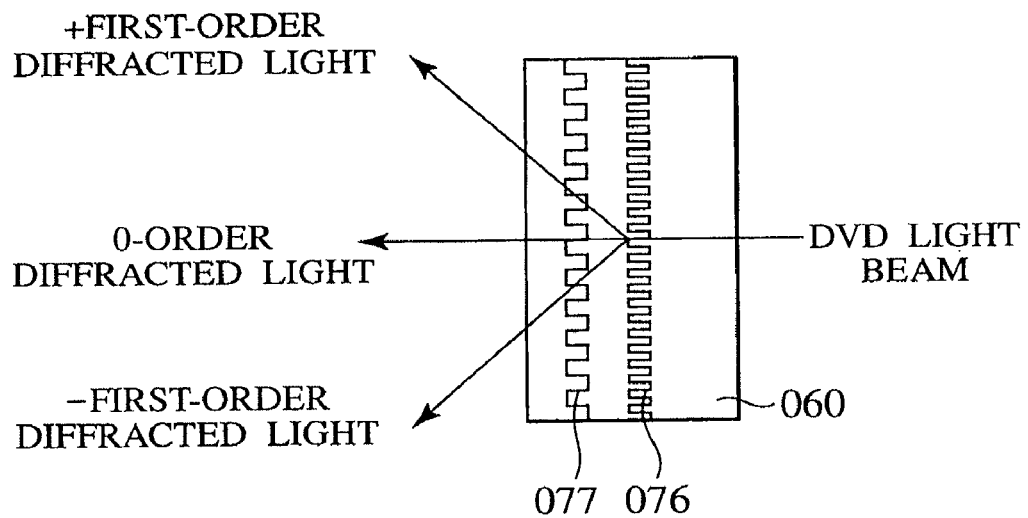
FIGS. 4A and 4B illustrate an ideal diffraction grating according to a third embodiment of the present invention.
Figure 4B:
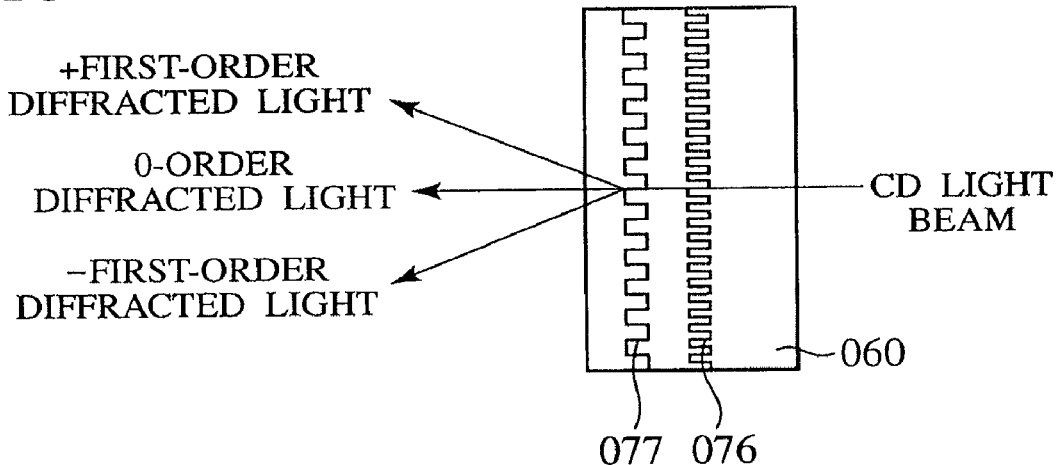

FIGS. 4A and 4B are schematic diagrams of light beams diffracted by a diffraction grating 060. FIGS. 4A and 4B assume an ideal case. FIG. 4A shows a case where a DVD light beam is incident and FIG. 4B shows a case where a CD light beam is incident.

For recording to both a DVD and a CD, the diffraction grating 060 is formed with two grating patterns which are a DVD grating pattern 076 and a CD grating pattern 077 since a diffraction grating best suited to generation of a tracking error signal in a DVD is different from that in a CD.

Reference will first be made to FIG. 4A. When a DVD light beam is incident on the diffraction grating 060, o-order diffracted light (passing as it is without being diffracted), + first-order diffracted light and − first-order diffracted light are generated at the DVD grating surface 076. In an ideal case, the three 0-, + first- and − first-order diffracted light split at the DVD grating surface 076 pass through the CD grating pattern 077 without being diffracted. It follows that when the DVD light beam incident on the diffraction grating 060 emanates from the same diffraction grating, three light beams are outputted. The 0-order diffracted light corresponds to the main light beam 010 and the + and − first-order diffracted light correspond to the sub-light beams 011 and 012.

Reference will now be made to FIG. 4B. When directed to the diffraction grating 060, a CD light beam passes through the ideal DVD grating surface 076 without being diffracted. Upon incidence on the CD grating pattern 077, 0-order diffracted light (passing as it is without being diffracted) and + and − first-order diffracted light are generated. Therefore, three light beams are outputted when the CD light beam incident on the diffraction grating 060 emanates from the same diffraction grating. In the CD optical system, the 0-order diffracted light corresponds to the main light beam 013 and the + and − first-order diffracted light correspond to the sub-light beams 014 and 015 respectively.

Since the CD grating pattern 077 is wider in grating pitch than the DVD grating pattern 076, the + and − first-order diffracted light beams of a CD are narrower in diffraction angle than the + and − first-order diffracted light beams of a DVD.

The DVD grating pattern is given wavelength selectivity so as not to be diffracted at the wavelength (785 nm) of the CD light beam and the CD grating pattern is given wavelength selectivity so as not to be diffracted at the wavelength (660 nm) of the DVD light beam. Such an exclusive action (wavelength selectivity) can be attained by forming each grating pattern such that the groove depth is larger than that of an ordinary diffraction grating and the duty ratio of the grating pitch is deviated from 0.5.

Actually, however, due to a production error (variations), it is impossible to impart a perfect wavelength selectivity to each grating pattern.

Figure 5A:
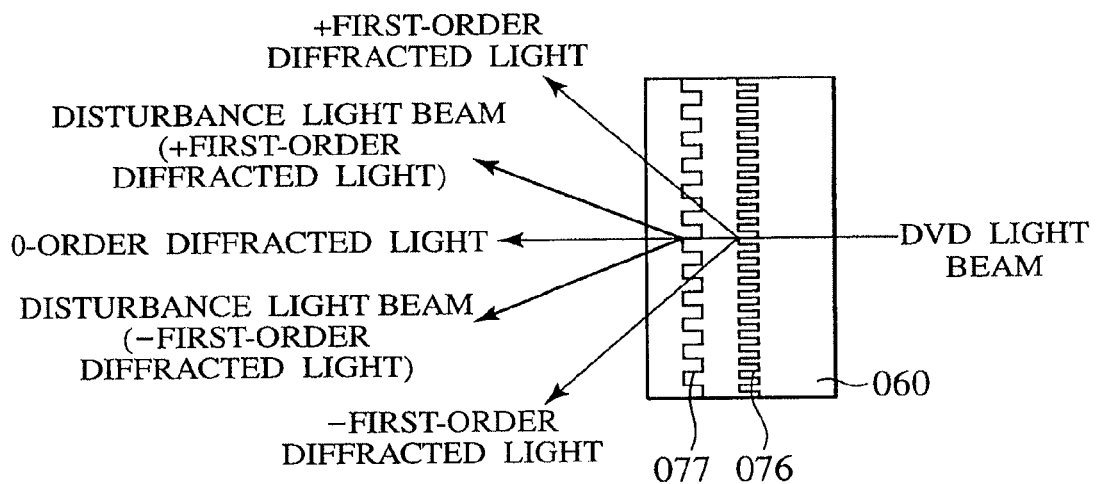
FIGS. 5A and 5B illustrate a disturbance light beam in an actual diffraction grating according to the third embodiment.
Figure 5B:
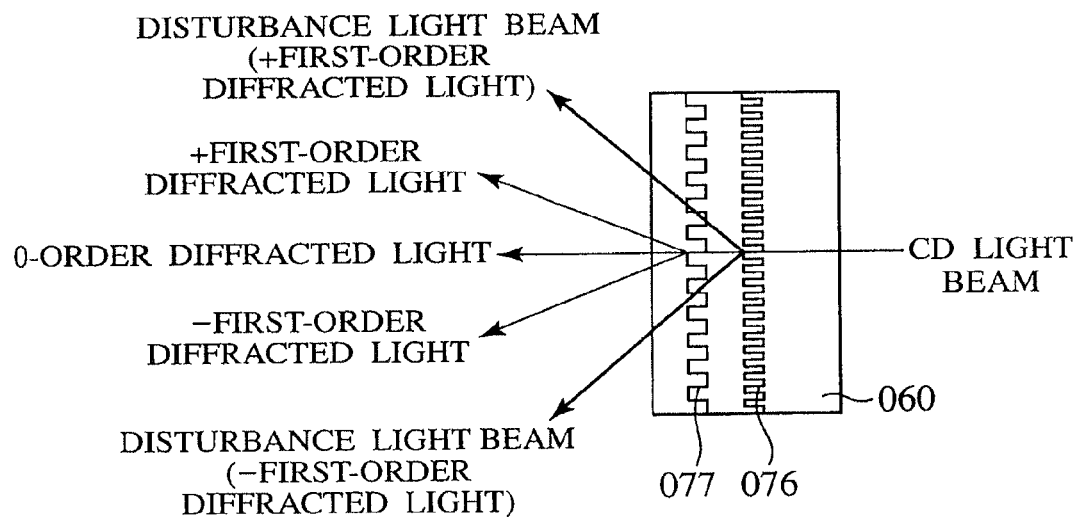

FIGS. 5A and 5B schematically illustrate light beams diffracted by the diffraction grating 060. FIGS. 5A and 5B assume an actual case. FIG. 5A shows diffraction in a case of incidence of a DVD light beam and FIG. 5B shows diffraction in a case of incidence of a CD light beam.

Unlike the ideal case of FIG. 4A, a DVD light beam incident on the diffraction grating 060 is diffracted by the CD diffraction pattern 077 and a disturbance light beam, which is an unnecessary light beam, is generated, as shown in FIG. 5A. Since the CD grating pattern 077 is wider in grating pitch than the DVD grating pattern 076, the disturbance light beam is smaller in output angle than the + and − first-order diffracted light beams.

The disturbance light beam which the DVD light beams generates by diffraction through the CD grating pattern 077 corresponds to the disturbance light beams 020 and 021.

Likewise, unlike the ideal case of FIG. 4B, a CD light beam incident on the diffraction grating 060 is diffracted by the DVD grating pattern 067 and a disturbance light beam, which is an unnecessary light beam, is generated. Since the DVD grating pattern 076 is narrower in grating pitch than the CD grating pattern 077, the disturbance light beam is larger in output angle than the + and − first-order diffracted light beams.

The disturbance light beam which the CD light beam generates through the DVD grating pattern 076 corresponds to the disturbance light beams 022 and 023. Generally, an output angle θ of a diffracted light beam satisfies the relation represented by the following arithmetic expression (8):

$$d \sin \theta = n\lambda \ (n=0, 1, 2, \ldots) \tag{8}$$

where d stands for the grating pitch of a diffraction grating pattern, λ stands for wavelength, and n stands for an n-order of diffraction. That is, the output angle θ of the + and − first-order diffracted light beams is in a relation such that the larger the wavelength, the larger the output angle, and the larger the grating pitch d, the smaller the output angle.

In such a construction using a diffraction grating having two grating surfaces or using two diffraction gratings on the same optical path, the generation of a disturbance light beam is unavoidable. Therefore, in the photodetector described above in connection with FIG. 1, detection areas are arranged in such a manner that the disturbance light beam does not contribute to the interference on the photodetector.

Although in this embodiment the DVD grating pattern 076 is disposed on the side close to the incidence plane of the diffraction grating 060 and the CD grating pattern 077 is disposed on the side close to the output plane of the diffraction grating, it goes without saying that the DVD grating pattern may be disposed on the side close to the output plane of the diffraction grating.

Figure 6A:
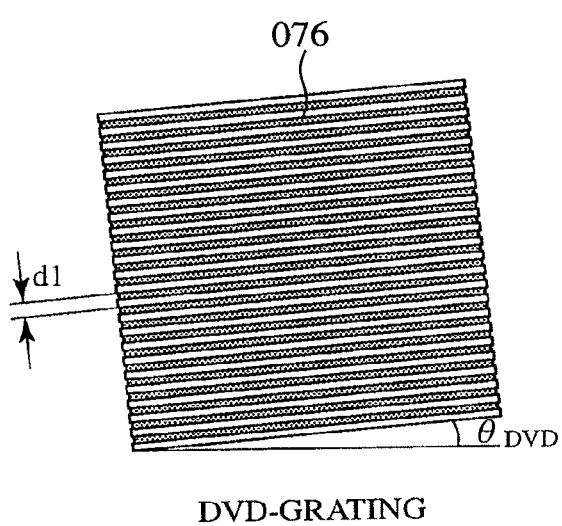
FIG. 6 illustrates grating patterns of the diffraction grating according to the third embodiment.
Figure 6B:
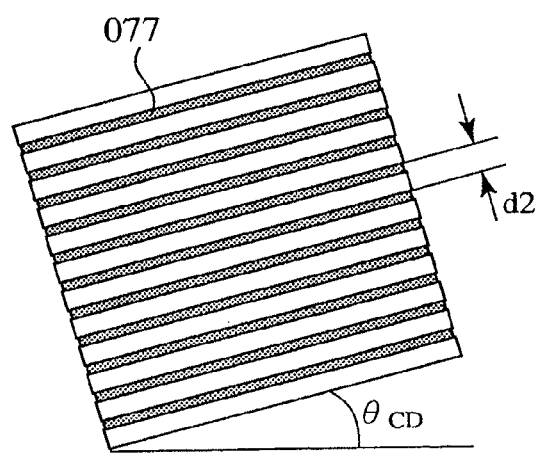

The following description is now provided about the details of the diffraction pattern according to this embodiment. FIGS. 6A and 6B show diffraction patterns of the diffraction grating 060. FIG. 6A shows the DVD grating pattern 076 and FIG. 6B shows the CD grating pattern 077. The DVD grating pattern corresponds to DVD±R/RW and the CD grating pattern corresponds to CD-R/RW.

As shown in FIG. 6A, the DVD grating pattern 076 has a grating pitch of d1, the angle of which is inclined by $\theta_{DVD}$. On the other hand, as shown in 6B, the CD grating pattern 077 has a grating pitch of d2, the angle of which is inclined by $\theta_{CD}$. The illustrated diffraction grating is characteristic in that the pitches d1 and d2 are made different from each other to avoid overlapping of the disturbance light beam with the sub-light beams. In particular, if d1 is set to be smaller than d2, an advantage accrues that detection areas can be arranged small on the photodetector. This point will be explained later.

The DVD grating pattern 076 and the CD grating pattern 077 are inclined at different angles ($\theta_{DVD}$ and $\theta_{CD}$), respectively. This is because an optimal angle in performing DPP is different between a DVD and a CD.

That is, the diffraction grating according to this embodiment is a lamination of two grating patterns, which patterns are different in grating pitch and pitch angle from each other. The use of such a diffraction grating brings about an effect that it is possible to detect a highly accurate and stable tracking error signal by DPP which signal is free of mutual disturbance light beam-based interference between a DVD and a CD.

Figure 7A:
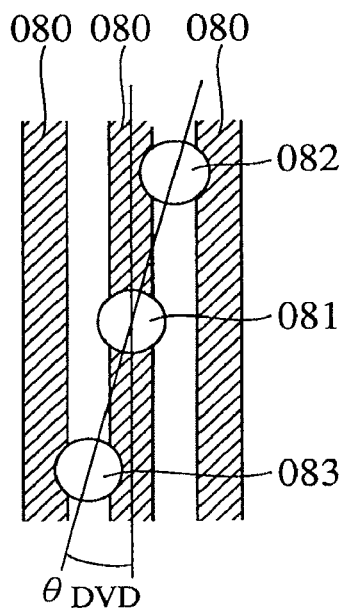
FIGS. 7A and 7B illustrate a layout of spots on an optical disc in the third embodiment.

Next, with reference to FIG. 7, a description will be given of the reason why grating patterns are different in pitch angle for effecting an optimal DPP in both a DVD and a CD. FIGS. 7A and 7B illustrate layouts of spots on an optical disc. FIGS. 7A and 7B show a DVD-R and a CD-R, respectively. In the DVD-R, guide grooves 080 are formed as in FIG. 7A. Data are to be recorded along the guide grooves 080. The spacing of adjacent guide grooves 080 in DVD-R is as extremely small as 0.74 μm. As described above, DPP is a technique wherein sub-light spots are spaced one half of a guide groove apart in the radial direction of the optical disc from a main light spot on the optical disc. Therefore, also in FIG. 7A, sub-light spots 082 and 083 are spaced one half of a guide groove apart in the radial direction (right and left direction in the figure) of the optical disc relative to a main light spot 081. Therefore, in a DVD-R, the angle of the main light spot 081 and the sub-light spots 082, 083 is inclined at $\theta_{DVD}$ relative to the direction parallel to the guide grooves.

Figure 7B:
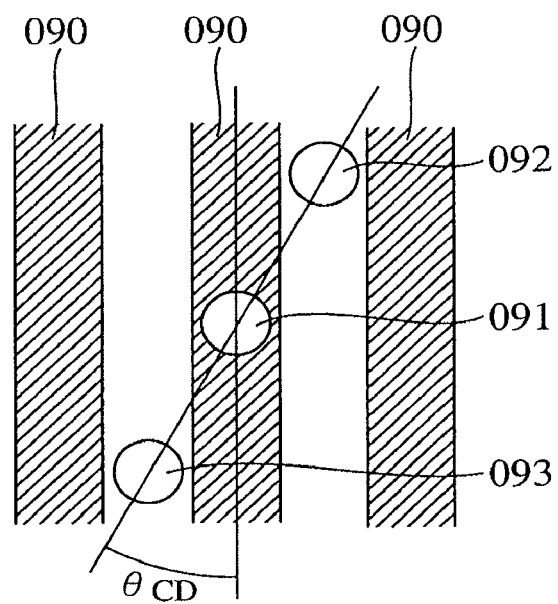

In the CD-R shown in FIG. 7B, the spacing between adjacent guide grooves 090 is as large as 1.6 μm in comparison with that in DVD-R. Therefore, to perform DPP it is necessary that sub-light spots 092 and 093 be spaced one half of a guide groove apart in the radial direction (right and left direction) of the optical disc relative to a main light spot 091 as shown in the figure. In the CD-R, the angle of the main light spot 091 and the sub-light spots 902, 093 is inclined at $\theta_{CD}$, relative to the direction parallel to the guide grooves, which is different from $\theta_{DVD}$. That is, the guide groove spacing is different between the DVD-R and CD-R, so that, a three-beam angle on the disc best suited to DPP is also different between the DVD-R and CD-R. For this reason, two grating patterns are required to effect recording by the optical pickup using the two-wavelength multilaser with respect to both the DVD-R and CD-R.

Fourth Embodiment

A description will be given of a diffraction grating mounted on a two-wavelength multilaser-carrying optical pickup applicable to a super multi-type optical disc apparatus according to a fourth embodiment. The fourth embodiment is new in that a DVD grating pattern 099 different from the DVD grating pattern 076 in the third embodiment is used, whereby it is possible to implement an optical pickup capable of being mounted on a super multi-type optical disc apparatus.

Standards on the DVD include DVD-R/RW, DVD-RAM and DEV-ROM. An optical disc apparatus capable of meeting all of these DVD and CD standards is called a super multi-type optical disc apparatus. In particular, DVD-R/RW and DVD-RAM are discs of different standards in guide groove spacing. In DPP, as noted earlier, it is necessary that a main light beam and sub-light beams be directed to predetermined positions on a disc. Accordingly, an irradiation position of the main light beam is different form those of the sub-light beams on a guide groove spacing basis. This produces a problem in that DPP cannot be applied to a disc of a standard different in guide groove spacing.

Figure 8A:
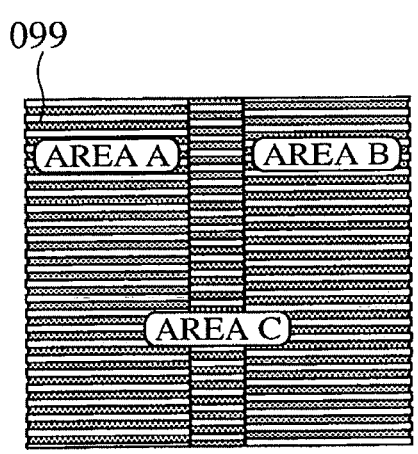
FIG. 8 illustrates grating patterns of a diffraction grating according to a fourth embodiment of the present invention.
Figure 8B:
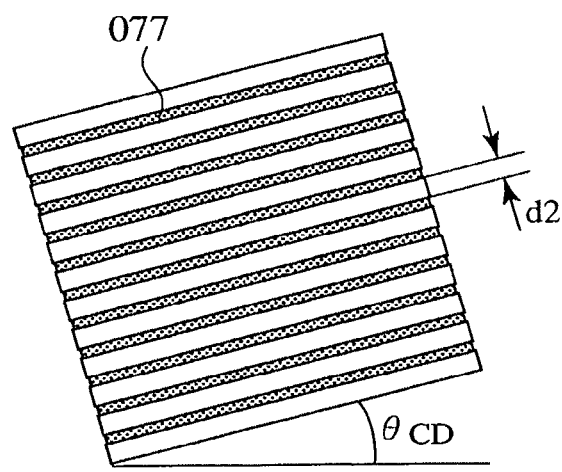

FIGS. 8A and 8B show the grating patterns of a diffraction grating 060. FIGS. 8A and 8B show the DVD grating pattern 099 and the CD grating pattern 077, respectively. An explanation of the CD grating pattern will here be omitted because it is the same grating pattern as in the third embodiment.

As shown in FIG. 6A, the DVD grating pattern 099 has a grating pitch d1 like that of the DVD grating pattern 076 in FIG. 6A, but the pitch is an angle-free pitch. Consequently, a relative angle between the DVD grating pattern and the CD grating pattern is inclined at $\theta_{CD}$. The diffraction grating is characterized in that d1 and d2 are different pitches and are set so as not to cause an overlap between a disturbance light beam and sub-light beams on the photodetector 001. In particular, if d1 is set to be smaller than d2, an effect is provided that detection areas can be arranged small on the photodetector. This point will be explained later.

The DVD grating pattern 099 is divided into three areas A, B and C, which are grating patterns different in phase from one another by 90°. Specifically, the areas A and C are in a phase shift of approximately 90° relative to a light beam. The areas B and C are in a phase shift of approximately 90° relative to a light beam. The areas A and B are arranged respectively at both ends of the grating pattern 099, and the area C is disposed between the areas A and B. With use of this diffraction grating it is possible to detect tracking error signals by the phase difference DPP. That is, tracking error signals can be detected from both a DVD-R/RW and a DVD-RAM. Thus, a super multi-type optical pickup can be implemented by laminating the DVD grating pattern 099 and a linear diffraction grating inclined by the grating angle of $\theta_{CD}$.

Fifth Embodiment

A description will be given of a two-wavelength multilaser-carrying optical pickup for a super multi-type optical disc apparatus according to a fifth embodiment.

Figure 9:
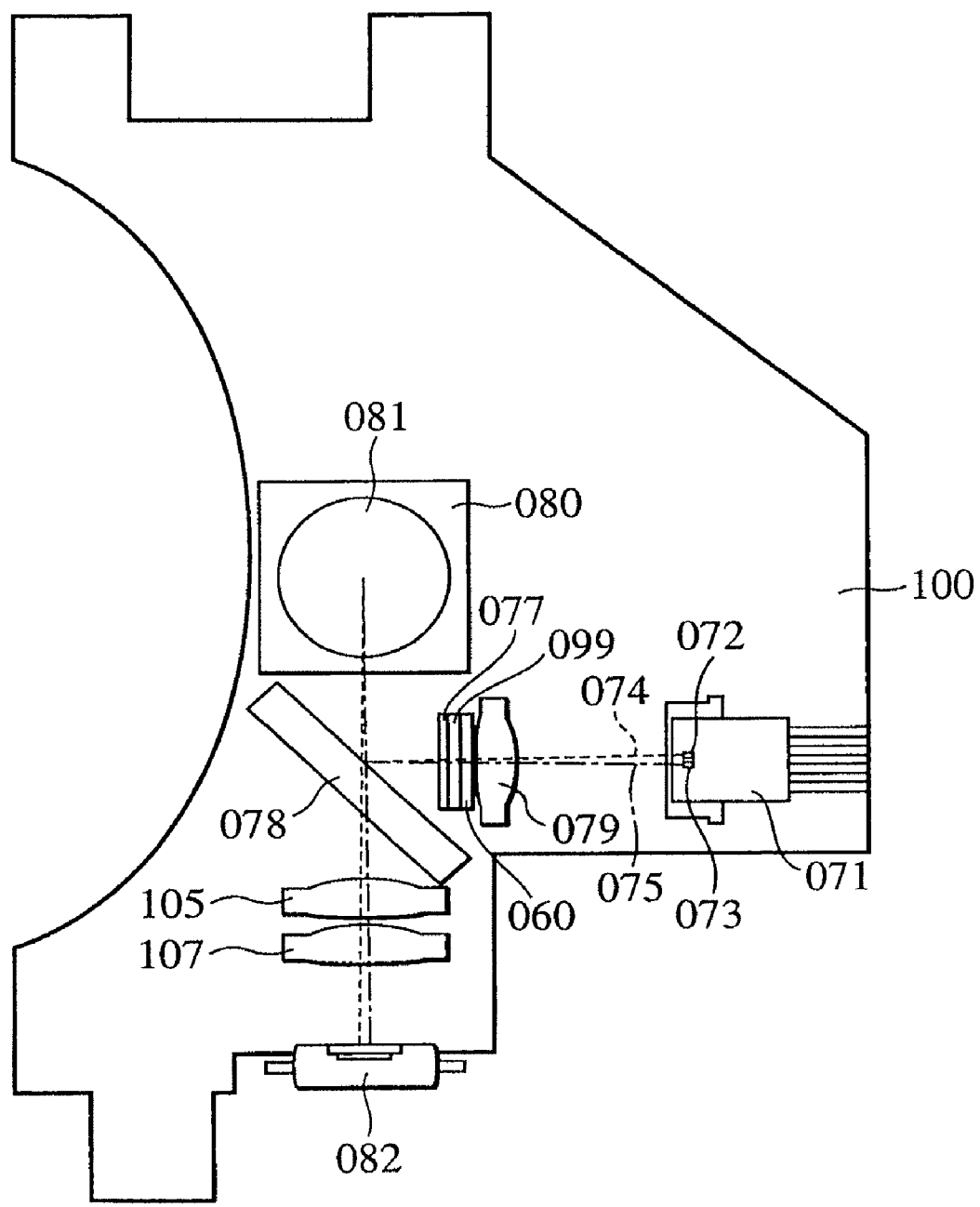
FIG. 9 illustrates a schematic construction of an optical pickup according to a fifth embodiment of the present invention.

FIG. 9 illustrates the construction of an optical system in an optical pickup 100. Components of the same functions as in the optical system of the second embodiment are identified by the same reference numerals as in the optical system.

As in the second embodiment, a two-wavelength multilaser 071 is a laser light source carrying two laser chips thereon which are a DVD laser chip 072 adapted to emit a light beam having a wavelength of about 660 nm for a DVD and a CD laser chip 073 adapted to emit a light beam having a wavelength of about 785 nm for a CD.

Reference will first be made to a DVD optical system. A DVD light beam is emitted as divergent light from the DVD laser chip 072 provided within the two-wavelength multilaser 071. A dotted line 074 in the figure represents an optical path of the DVD light beam. The DVD light beam emitted from the DVD laser chip 072 is incident on a collimating lens 079, whereby it is converted to a substantially parallel light beam. The light beam then enters a diffraction grating 060. The diffraction grating 060 is provided with a DVD grating pattern 099 which can generate an optimal tracking error signal by a phase difference DPP method and a CD grating pattern 077 which can generate a tracking error signal by DPP in a CD.

According to this construction, the DVD light beam incident on the diffraction grating 060 is split by the DVD grating pattern 099 into three optimal light beams by the phase difference DPP method. The DVE light beam which has passed through the DVD grating pattern 099 then passes through the CD grating pattern 077. Ideally the CD grating pattern 077 is designed to permit 100% transmission of the DVD light beam, but actually generates a disturbance light beam slightly.

The DVD light beam which has passed through the CD grating pattern 077 is reflected by the beam splitter 078, then is reflected in a z-direction (a direction perpendicular to the paper surface) by a reflection mirror 080 and is condensed onto an optical disc (not shown) by an objective lens 081.

The DVD light beam is reflected by the optical disc, then passes through the objective lens 081, reflection mirror 080, beam splitter 078, detection lenses 105 and 107, and reaches a photodetector 082. A predetermined astigmatism is imparted to the DVD light beam when passing through the beam splitter 078 and is used in generating a focusing error signal by the differential astigmatic method. The detection lenses 105 and 107 function to not only turn the direction of astigmatism in a predetermined direction but also determine the size of a light spot on the photodetector 082.

The use of the two detection lenses also brings about an effect that the spacing between the beam splitter 078 and the photodetector 082 can be made small.

The DVD light beam which has been directed to the photodetector 082 is used for detection of an information signal recorded on the optical disc and for detection of a position control signal for a light spot on the optical disc such as a tracking error signal or a focusing error signal.

Next, a CD optical system will be described. A CD light beam is emitted as divergent light from the CD laser chip 073 disposed within the two-wavelength multilaser 073. A dotted line 075 in the figure represents an optical path of the CD light beam. The CD light beam emitted from the CD laser chip 073 is incident on the collimating lens 079, whereby it is converted to a generally parallel light beam. An output angle of the CD light beam is inclined in comparison with the DVD light beam, but this is because the DVD laser chip 072 and the CD laser chip are spaced 110 μm apart from each other in a y-direction in the figure. Therefore, if it is assumed that an optical axis of the DVD light beam is incident perpendicularly on the center of the objective lens 081, it follows that the center of the CD light beam is inclined.

The light beam which has passed through the collimating lens 079 is incident on the diffraction grating 060 and then passes through the DVD grating pattern 099. Ideally the DVD grating pattern 090 is designed to permit 100% transmission of the CD light beam, but actually generates a disturbance light beam slightly. The CD light beam which has passed through the DVD grating pattern 099 is incident on the CD grating pattern 077, whereby it is split into three light beams best suited to DPP for a CD.

The CD light beam which has passed through the CD grating pattern 077 is reflected by the beam splitter 078, then is reflected in a z-direction (a direction perpendicular to the paper surface) in the figure by the reflection mirror 080 and is condensed onto the optical disc (not shown) by the objective lens 081 mounted on an actuator (not shown).

The CD light beam is reflected by the optical disc, then passes through the objective lens 081, reflection mirror 080, beam splitter 078, detection lenses 105 and 107, and reaches the photodetector 082. The CD light beam is also given a predetermined astigmatism when passing trough the beam splitter 078 and is used for generation of a focusing error signal by the differential astigmatic method. The detection lenses 105 and 107 function to not only turn the direction of astigmatism in a predetermined direction but also determine the size of a light spot on the photodetector 082. The use of two detection lenses brings about an effect that the spacing between the beam splitter 078 and the photodetector can be made small. The CD light beam which has been directed to the photodetector 082 is used for detection of an information signal recorded on the optical disc and for detection of a position control signal for a light spot on the optical disc such as a tracking error signal or a focusing error signal.

Thus, in the optical pickup carrying the two-wavelength multilaser thereon, the optical path of the DVD light beam is substantially coincident with that of the CD light beam. Accordingly, the DVD light beam inevitably passes through not only the DVD grating pattern but also the CD grating pattern. Likewise, the CD light beam inevitably passes through not only the CD grating pattern but also the DVD grating pattern. Therefore, the generation of a disturbance light beam is unavoidable.

In the optical pickup according to this embodiment, the interference of a disturbance light beam with another light beam on the photodetector is avoided as described in the first embodiment, whereby it is possible to generate highly accurate and stable tracking error signal and focusing error signal as in the conventional optical pickup.

The optical pickup 100 of the fifth embodiment is different from the optical pickup 070 of the second embodiment in a positional relation among the diffraction grating 060, collimating lens 079 and beam splitter 078. According to the construction of the optical pickup 100, an outputted light beam is first incident on the collimating lens 079, then incident on the diffraction grating 060 and lastly incident on the beam splitter 078. That is, the diffraction grating 060 is disposed in a position in which the light beam emitted from the laser light source enters the diffraction grating 060 after converted to a parallel light beam by the collimating lens 079. In addition, the laser light beam emitted from the laser light source passes through the collimating lens 079, diffraction grating 060, beam splitter 078 and objective lens 081 in this order and enters the optical information recording medium. With this construction, the diffraction grating 077 is disposed behind the collimating lens 079, so that a generally parallel light beam is incident on the diffraction grating. It follows that the diffraction grating 077 is disposed in a position where the effective diameter of the light beam is the largest.

Since the DVD grating pattern is a pattern divided in three, if an error occurs between the center of the light beam and that of the diffraction grating, a problem will arise in that the amplitude of the tacking error signal decreases.

Figure 10A:
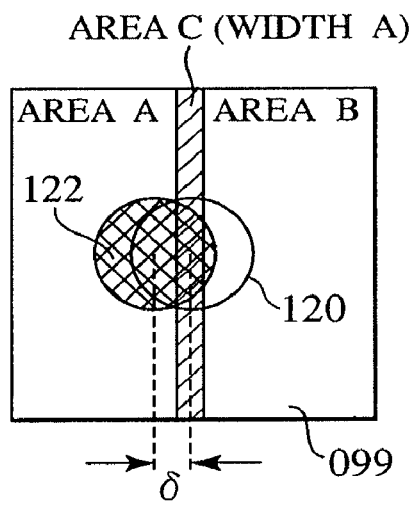
FIGS. 10A and 10B illustrate the relationship between effective diameters of light beams incident on a diffraction grating in the fifth embodiment and a component error.
Figure 10B:
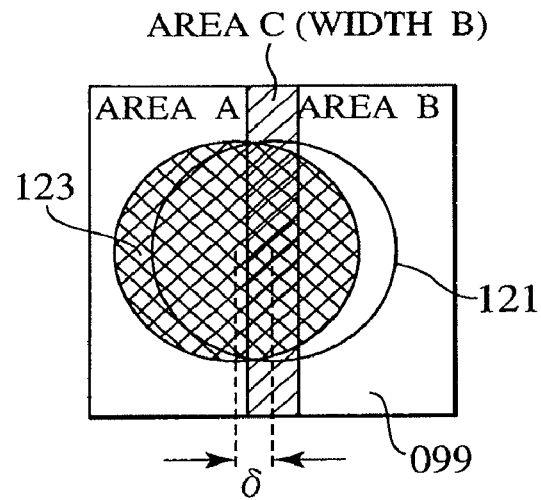

FIGS. 10A and 10B illustrate the relationship between the DVD grating pattern 099 and a light beam incident thereon. FIG. 10A shows a case where an effective diameter of an incident light beam is small and FIG. 10B shows a case where the effective diameter is large. The width of an area C in the DVD grating pattern 099 is set at a predetermined ratio relative to the effective diameter. In FIG. 10A, the width A of the area C is small because a light beam 120 of a small effective diameter is incident on the DVD grating pattern 099. Conversely, in FIG. 10B, the width B of the area C is larger than the width A because a light beam 121 larger in effective diameter than the light beam 120 is incident on the DVD grating pattern 099.

When the optical pickup is assembled, a mounting error in the right and left direction in the figure of the DVD grating pattern is unavoidable and a positional error occurs between the center of a light beam and that of the DVD grating pattern. This error results in a decrease of TES signal amplitude. Once a mounting error δ occurs, the center of a light beam and that of the DVD grating pattern 099 are deviated from each other by an amount of δ. In FIG. 10A if it shifts by an amount corresponding to the mounting error δ, the light beam 120 moves to the position of the light beam 122, while in FIG. 10B if it shifts by an amount corresponding to the mounting error δ, the light beam 121 moves to the position of the light beam 123. In a case of occurrence of the same mounting error δ as in the figure, the shift between the light beam 122 and the area C looks large because the effective diameter of the light beam 122 is small. On the other hand, the shift between the light beam 123 and the area C looks small because the effective diameter of the light beam 123 is large. Thus, in a case of a large effective diameter, the component mounting error is less influential. Therefore, if the diffraction grating 077 is disposed behind the collimating lens 079 as in FIG. 9 and if a construction is adopted wherein the effective diameter of the light beam incident on the diffraction grating 07 is made large, an effect of diminishing the influence of the component mounting error can be provided.

If the diffraction grating 077 is disposed behind the collimating lens 079 as in the fifth embodiment, the influence of the component mounting error can be minimized because the effective diameter of the light beam incident on the diffraction grating 077 can be made largest. Since the effect of diminishing the influence of the component mounting error can be obtained by enlarging the effective diameter of the light beam incident on the diffraction grating 077, for example the diffraction grating 077 may be disposed between the collimating lens 079 and the two-wavelength multilaser 071. In this case, the closer to the collimating lens 079 the diffraction grating 077 is disposed, the less influential can be made the component mounting error.

Although in this fifth embodiment a description has been given of the optical pickup for an optical disc apparatus capable of reading and writing from and to a DVD and a CD, it goes without saying that the present invention is applicable to an optical pickup for not only a CD but also the next-generation high-density optical disc apparatus (BD and HD-DVD) using a blue color emitted semiconductor laser.

In an information read/write apparatus using a conventional optical pickup, it is necessary that the light quantity of a light beam to be directed to an optical disc be controlled constant in order to effect a stable read/write processing. Further, a device (generally called a front monitor) which detects the light quantity of a light beam emitted from a laser light source is provided within the optical pickup and the detected amount of light is fed back to the laser light source, whereby the light quantity of the light beam to be directed to the optical disc is controlled accurately. It goes without saying that the optical pickup of this embodiment is employable as the optical pickup using the front monitor although reference is not made thereto because this has no direct bearing on this embodiment.

Although in this embodiment both a DVD grating pattern and a CD grating pattern are formed in one diffraction grating, it goes without saying that two diffraction gratings may be used which are a diffraction grating dedicated to a DVD and a diffraction grating dedicated to a CD.

Sixth Embodiment

Figure 11:
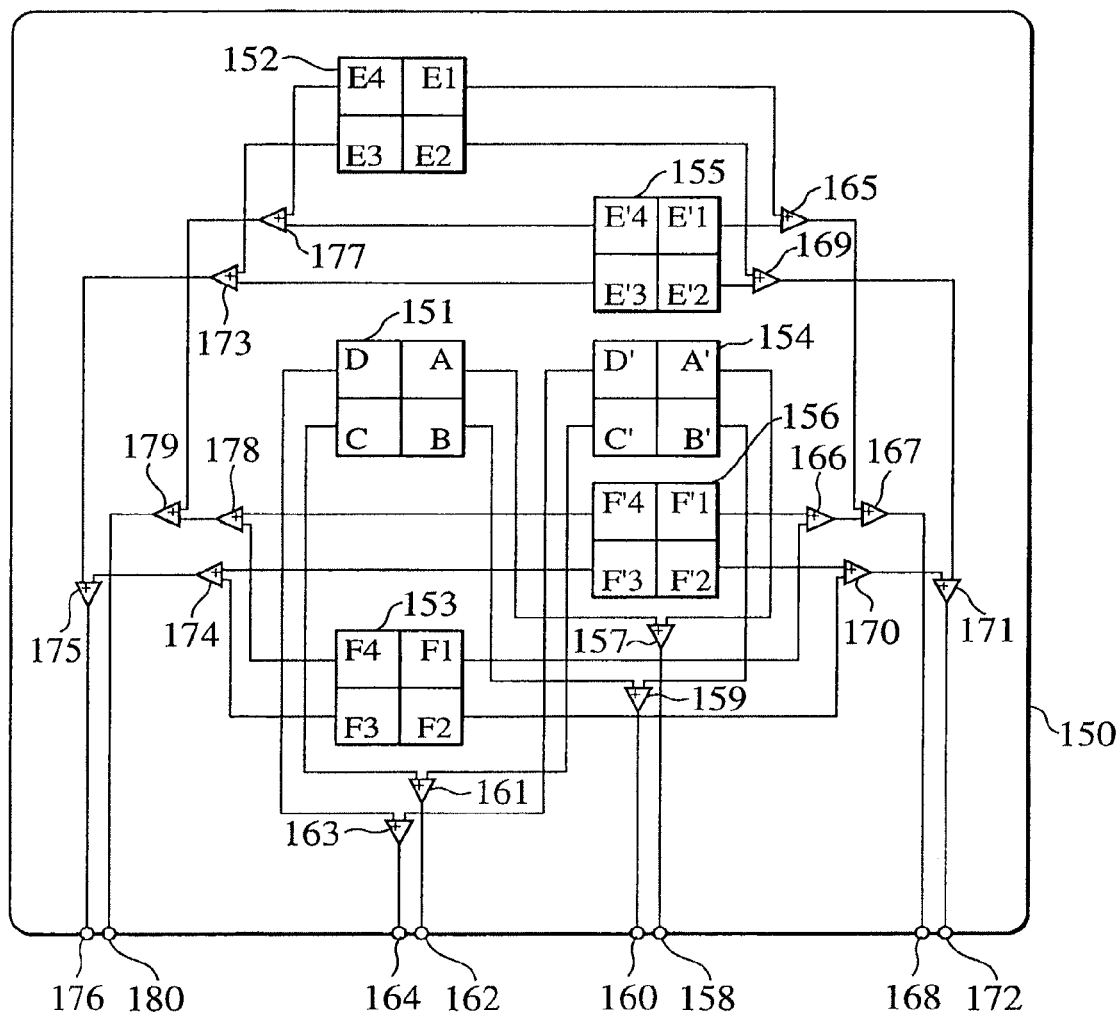
FIG. 11 illustrates an internal connection of a photodetector according to a sixth embodiment of the present invention.

A description will be given of a signal output from a photodetector according to a sixth embodiment. FIG. 11 illustrates a detection pattern of a photodetector 150 and an internal connection.

The photodetector 150 includes six detection areas 151, 152, 153, 154, 155 and 156. Each of the detection areas is divided in four. The detection area 151 has detection surfaces A, B, C, D, the detection area 152 has detection surfaces E1, E2, E3, E4, the detection area 153 has detection surfaces F1, F2, F3, F4, the detection area 155 has detection surfaces A', B', C', D', the detection area 156 has detection surfaces E'1, E'2, E'3, E'4, and the detection area 157 has detection surfaces F'1, F'2, F'3, F'4. If all of signals detected from these detection surfaces of the detection areas are to be outputted to the exterior, it is necessary to provide twenty-four output pins. On this regard, this embodiment is characterized in that the number of output pins is reduced to eight by calculating output signals in the interior of the photodetector 150. The following description is now provided about the calculation performed for reducing the number of output pins.

Output signals from the detection surfaces A and A' are added to each other in an adder 157 disposed in the interior of the photodetector 150 and a resulting signal of (A+A') is outputted from an output pin 158.

Output signals from the detection surfaces B and B' are added to each other in an adder 159 disposed in the interior of the photodetector 150 and the resulting signal of (A+A') from an output pin 160.

Output signals from the detection surfaces C and C' are added to each other in an adder 161 disposed in the interior of the photodetector 150 and the resulting signal of (A+A') are output from an output pin 162.

Output signals from the detection surfaces D and D' are added to each other in an adder 163 disposed in the interior of the photodetector 150 and the resulting signal of (A+A') is output from an output pin 164.

Output signals from the detection surfaces E1 and E'1 are added to each other in an adder 165 disposed in the interior of the photodetector 150, output signals from the detection surfaces F1 and F'1 are added to each other in an adder 166 disposed in the interior of the photodetector 150, and then the signals outputted from the adders 165 and 166 are added to each other in an adder 167 disposed in the interior of the photodetector 150, whereby the resulting signal of (E1+E'1+F1+F'1) is outputted from an output pin 168.

Output signals from the detection surfaces E2 and E'2 are added to each other in an adder 169 disposed in the interior of the photodetector 150, output signals from the detection surfaces F2 and F'2 are added to each other in an adder 170 disposed in the interior of the photodetector 150, and then signals outputted from the adders 169 and 170 are added to each other in an adder 171 disposed in the interior of the photodetector 150, whereby the resulting signal of (E2+E'2+F2+F'2) is outputted from an output pin 172.

Output signals from the detection surfaces E3 and E'3 are added to each other in an adder 173 disposed in the interior of the photodetector 150, output signals from the detection surfaces F3 and F'3 are added to each other in an adder 174 disposed in the interior of the photodetector 150, and then signals outputted from the adders 173 and 174 are added to each other in an adder 175 disposed in the interior of the photodetector 150, whereby the resulting signal of (E3+E'3+F3+F'3) is outputted from an output pin 176.

Output signals from the detection surfaces E4 and E'4 are added to each other in an adder 177 disposed in the interior of the photodetector 150, output signals from the detection surfaces F4 and F'4 are added to each other in an adder 178 disposed in the interior of the photodetector, and then signals outputted from the adders 177 and 178 are added to each other in an adder 179 disposed in the interior of the photodetector 150, whereby the resulting signal of (E3+E'3+F3+F'3) is outputted from an output pin 180.

Various detected signals can be obtained by the following equations (9) to (14):

$$\text{Total DVD main light quantity} = P158 + P160 + P162 + P164 = A + B + C + D + A' + B' + C' + D' = A + B + C + D \quad (9)$$

Here, in a case of writing to and reading from a DVD, the laser light source for a CD is not turned ON and so no detected signals are output from the detection areas 154 and 155.

$$\text{Total CD main light quantity} = P158 + P160 + P162 + P164 = A + B + C + D + A' + B' + C' + D' = A' + B' + C' + D' \quad (10)$$

Here, in a case of writing to and reading from a CD, the laser light source for a DVD is not turned ON and so no detected signals are output from the detection areas 151, 152 and 153.

$$\text{DVD focusing error signal} = [(P158 + P162) - (P160 + P164)] + k \times [(P168 + P176) - (P172 + P180)] = [(A + C) - (B + D)] + k \times \{[(E1 + E3) - (E2 + E4)] + [(F1 + F3) - (F2 + F4)]\} + [(A' + C') - (B' + D')] + k' \times \{[(E'1 + E'3) - (E'2 - E'4)] + [(F'1 + F'3) - (F'2 + F'4)]\} = [(A + C) - (B + D)] + k \times \{[(E1 + E3) - (E2 + E4)] + [(F1 + F3) - (F2 + F4)]\} \quad (11)$$

Here, in a case of writing to and reading from a DVD, the laser light source for a CD is not turned ON and so no detected signals are output from the detection areas 154, 155 and 156.

$$\text{CD focusing error signal} = [(P158 + P162) - (P160 + P164)] + k \times [(P168 + P176) - (P172 + P180)] = [(A + C) - (B + D)] + k \times \{[(E1 + E3) - (E2 + E4)] + [(F1 + F3) - (F2 + F4)]\} + [(A' + C') - (B' + D')] + k' \times \{[(E'1 + E'3) - (E'2 - E'4)] + [(F'1 + F'3) - (F'2 + F'4)]\} = [(A' + C') - (B' + D')] + k' \times \{[(E'1 + E'3) - (E'2 + E'4)] + [(F'1 + F'3) - (F'2 + F'4)]\} \quad (12)$$

Here, in a case of writing to and reading from a CD the laser light source for a DVD is not turned ON and so no detected signals are output from the detection areas 151, 152 and 153.

$$\text{DVD tracking error signal} = [(P158 + P164) - (P160 + P162)] + k \times [(P168 + P180) - (P172 + P176)] = [(A + D) - (B + C)] - k \times \{[(E1 + E4) - (E2 + E3)] + [(F1 + F4) - (F2 + F3)]\} + [(A' + D') - (B' + C')] - k' \times \{[(E'1 + E'4) - (E'2 - E'3)] + [(F'1 + F'4) - (F'2 + F'3)]\} - [(A + D) - (B + C)] - k \times \{[(E1 + E4) - (E2 + E3)] + [(F1 + F4) - (F2 + F3)]\} \quad (13)$$

Here, in a case of writing to and reading from a DVD, the laser light source for a CD is not turned ON and so no detected signals are output from the detection areas 154, 155 and 156.

$$\text{CD tracking error signal} = [(P158 + P164) - (P160 + P162)] + k \times [(P168 + P180) - (P172 + P176)] = [(A + D) - (B + C)] - k \times \{[(E1 + E4) - (E2 + E3)] + [(F1 + F4) - (F2 + F3)]\} + [(A' + D') - (B' + C')] - k' \times \{[(E'1 + E'4) - (E'2 + E'3)] + [(F'1 + F'4) - (F'2 + F'3)]\} = [(A' + D') - (B' + C')] - k' \times \{[(E'1 + E'4) - (E'2 + E'3)] + [(F'1 + F'4) - (F'2 + F'3)]\} \quad (14)$$

Here, in a case of writing to and reading from a CD, the laser light source for a DVD is not turned ON and so no detected signals are output from the detection areas 151, 152 and 153.

In the above equations, k and k' stand for coefficients for correcting a light quantity ratio between main and sub-light beams.

Seventh Embodiment

A description will be given of an optical disc apparatus 200 on which the optical pickup described above is mounted, in accordance with a seventh embodiment.

Figure 12:
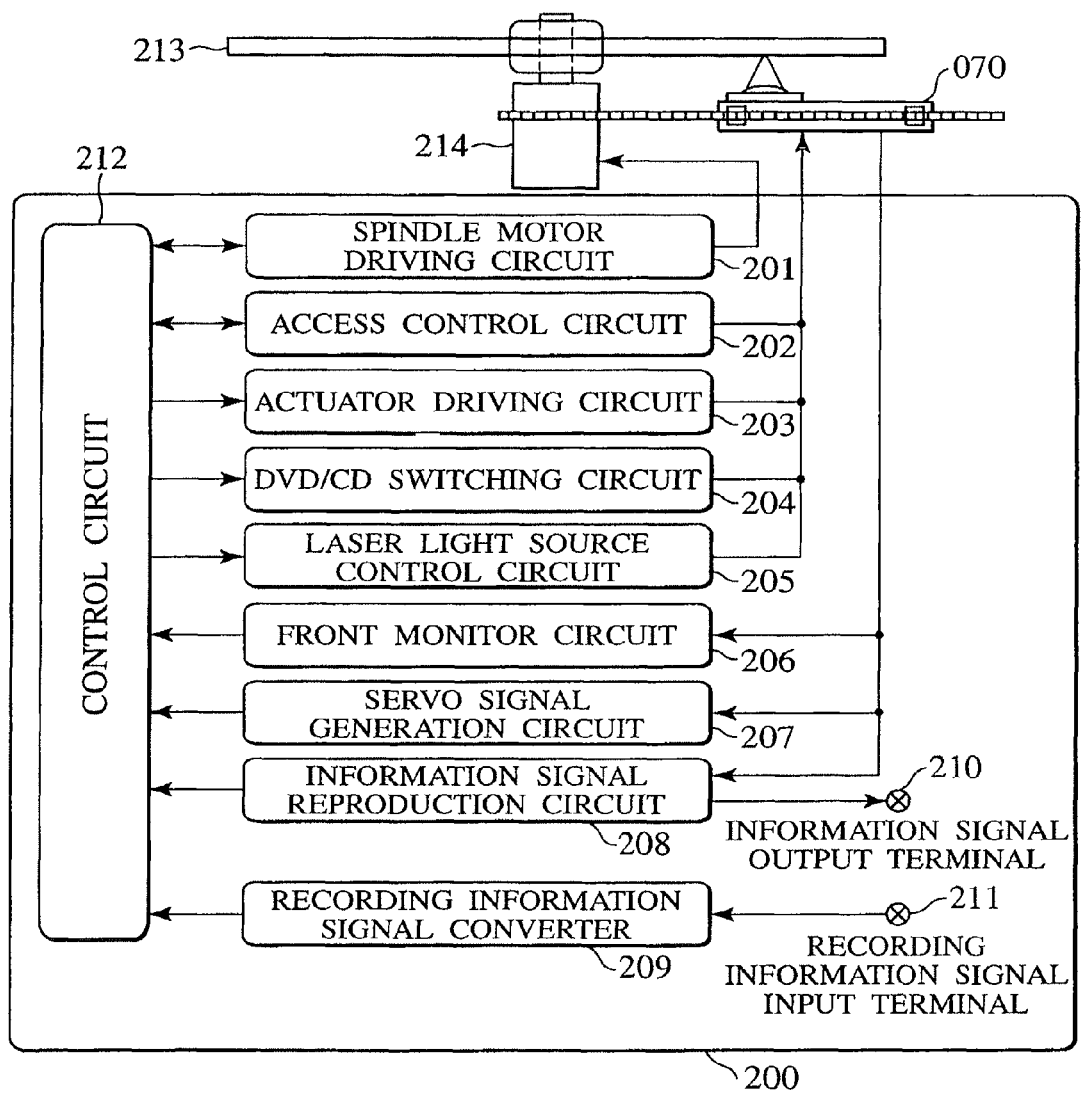
FIG. 12 illustrates a schematic construction of an optical disc apparatus according to a seventh embodiment of the present invention.

FIG. 12 is a schematic block diagram of the optical disc apparatus 200 for write and read on which an optical pickup 070 is mounted. Signals detected from the optical pickup 070 are fed to a servo signal generation circuit 207, a front monitor circuit 206 and an information signal reproduction circuit 208. In the servo signal generation circuit 207, a focusing error signal and a tracking error signal suitable for each optical disc are generated from the detected signals. The servo signals thus produced are fed as necessary from a control circuit 212 to an actuator driving circuit 203 to drive an objective lens actuator disposed within the optical pickup 070, whereby the position of the objective lens is controlled. The front monitor circuit 206 detects a light quantity monitor signal of the laser light source on the basis of a detected signal provided from the front monitor and drives a laser light source control circuit 205 in accordance with the detected light quantity monitor signal to control the quantity of light on an optical disc 213 accurately. In the information signal reproduction circuit 208, an information signal recorded on the optical disc 213 is reproduced from the above detected signal and is outputted to an information signal output terminal 210.

When inputted from a recording information signal input terminal 211, a recording information signal is converted to a predetermined laser driving recording signal in a recording information signal converter 209. The laser driving recording signal is fed to the control circuit 212 to drive the laser light source control circuit 205, thereby controlling the quantity of light in the laser light source and allowing the recording signal to be recorded onto the optical disc 213. An access control circuit 202 and a spindle motor driving circuit 201 are connected to the control circuit 212 to respectively control the position in an access direction of the optical pickup 070 and control the rotation of a spindle motor 214 for the optical disc 213.

The control circuit 212 has a function of determining the type of the optical disc 213 which is set in accordance with for example the focusing error signal produced from the servo signal generation circuit 207. The control circuit 212 determines which photodetector for a DVD or for a CD is to be made valid and which of a DVD light beam and a CD light beam is to be outputted, then drives a DVD/CD switching circuit.

Eighth Embodiment

In an eighth embodiment a description will be given of the reason why the detection areas on the photodetector can be arranged small by making the grating pitch d2 of the grating pattern 077 for a CD smaller than the grating pitch d1 of the grating pattern 076 for a DVD.

Figure 13A:
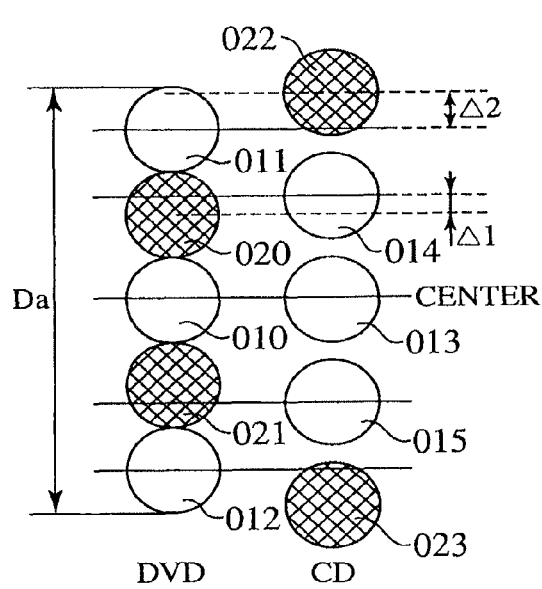
FIGS. 13A and 13B illustrate the layout relationship of light beams directed onto a photodetector according to an eighth embodiment of the present invention.
Figure 13B:
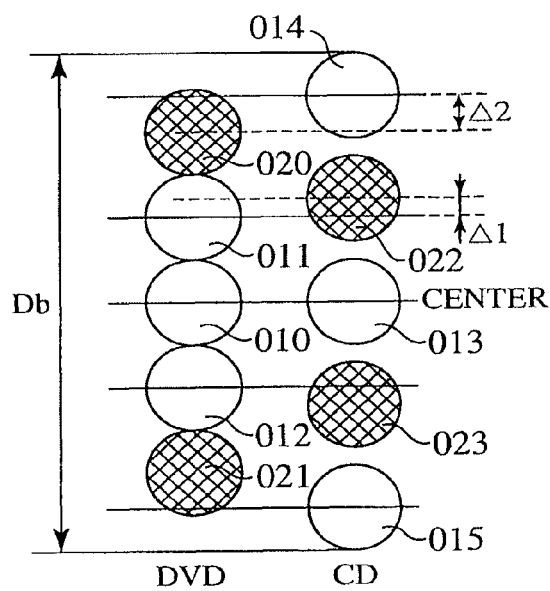
Figure 14:
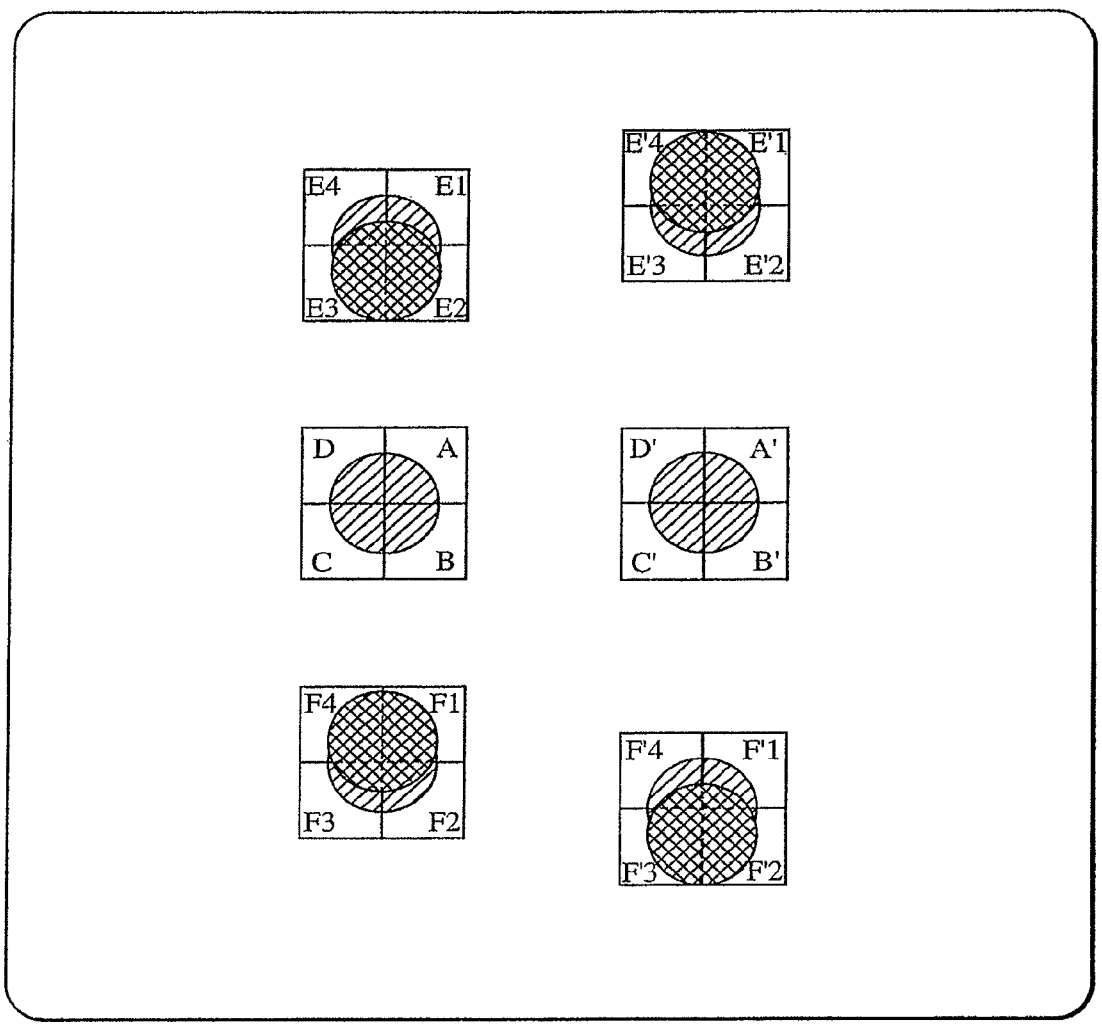
FIG. 14 illustrates a conventional photodetector.

FIGS. 13A and 13B schematically illustrate irradiated positions of light spots on the photodetector. FIG. 13A illustrates a case where the grating pitch d2 is smaller than the grating pitch d1 and FIG. 13B illustrates a case where the grating pitch d2 is larger than the grating pitch d1.

FIGS. 13A and 13B show a state in which DVD main light beam 010, DVD sub-light beams 011, 012, CD main light beam 013, CD sub-light beams 014, 015 and disturbance light beams 020, 021, 022, 023 are directed onto the photodetector.

In FIG. 13A, since d2 is smaller than d1, the CD sub-light beams 014 and 015 are smaller in diffraction angle than the DVD sub-light beams 011 and 012 and are directed to positions close to the light beam center. In connection with the diffraction angle, reference has been made above to the relational expression (7).

Since the CD is longer in wavelength than the DVD, the disturbance light beams 020 and 021 are directed to positions closer to the light beam center than the CD sub-light beams 014 and 015. The spacing between the disturbance light beam 020 and the sub-light beams 014 and that between the disturbance light beam 021 and the sub-light beam 015 are each assumed to be Δ1.

Likewise, the disturbance light beams 022 and 023 are directed to positions distant from the light beam center in comparison with the DVD sub-light beams 011 and 012. The spacing between the disturbance light beam 022 and the DVD sub-light beam 011 and that between the disturbance light beam 023 and the DVD sub-light beam 012 are each assumed to be Δ2. Since the smaller the grating pitch, the larger the diffraction angle, Δ2 will be larger than Δ1. In the case where the grating pitch d2 is smaller than the grating pitch d1 as in FIG. 13A, the size of the entire light receiving area in the photodetector is determined by the DVD sub-light beams 011 and 012 and is represented by symbol Da as shown in the same figure.

In the case of FIG. 13B, since d2 is larger than d1, the CD sub-light beams 014 and 015 is larger in diffraction angle than the DVD sub-light beams 011 and 012 and are directed to positions closer to the light beam center.

Since the CD is longer in wavelength than the DVD, the disturbance light beams 020 and 021 are directed to positions closer to the light beam center than the CD sub-light beams 014 and 015. Conversely to the case of FIG. 13A, the spacing between the disturbance light beams 020 and the CD sub-light beam 014 and that between the disturbance light beam 021 and the CD sub-light beam 015 are each Δ1.

Likewise, the disturbance light beams 022 and 023 are directed to positions closer to the light beam center than the DVD sub-light beams 011 and 012. The spacing between the disturbance beam 022 and the DVD sub-light beam 011 and that spacing between the disturbance beam 023 and the DVD sub-light beam 012 are each set at Δ1. It is like the case of FIG. 13A that Δ2 is larger than Δ1, because the smaller the grating pitch, the larger the diffraction angle. In the case where d2 is larger than d1 as in FIG. 13B, the size of the entire light receiving area in the photodetector is determined by the CD sub-light beams 014 and 015 and is represented by symbol Db as shown in the same figure.

As is seen from a comparison between the above cases of FIGS. 13A and 13B, Da is shorter than Db. This is attributable to the wavelengths of the DVD and CD. In order to make the size of the entire light receiving area in the photodetector small, the grating pitch d1 of the DVD grating pattern needs only to be smaller than the grating pitch d2 of the CD grating pattern.

Thus, the two-wavelength multilaser-carrying optical pickup embodying the present invention can generate highly accurate tracking error signal and focusing error signal free of any variation in light quantity caused by interference.

Ninth Embodiment

Figure 15:
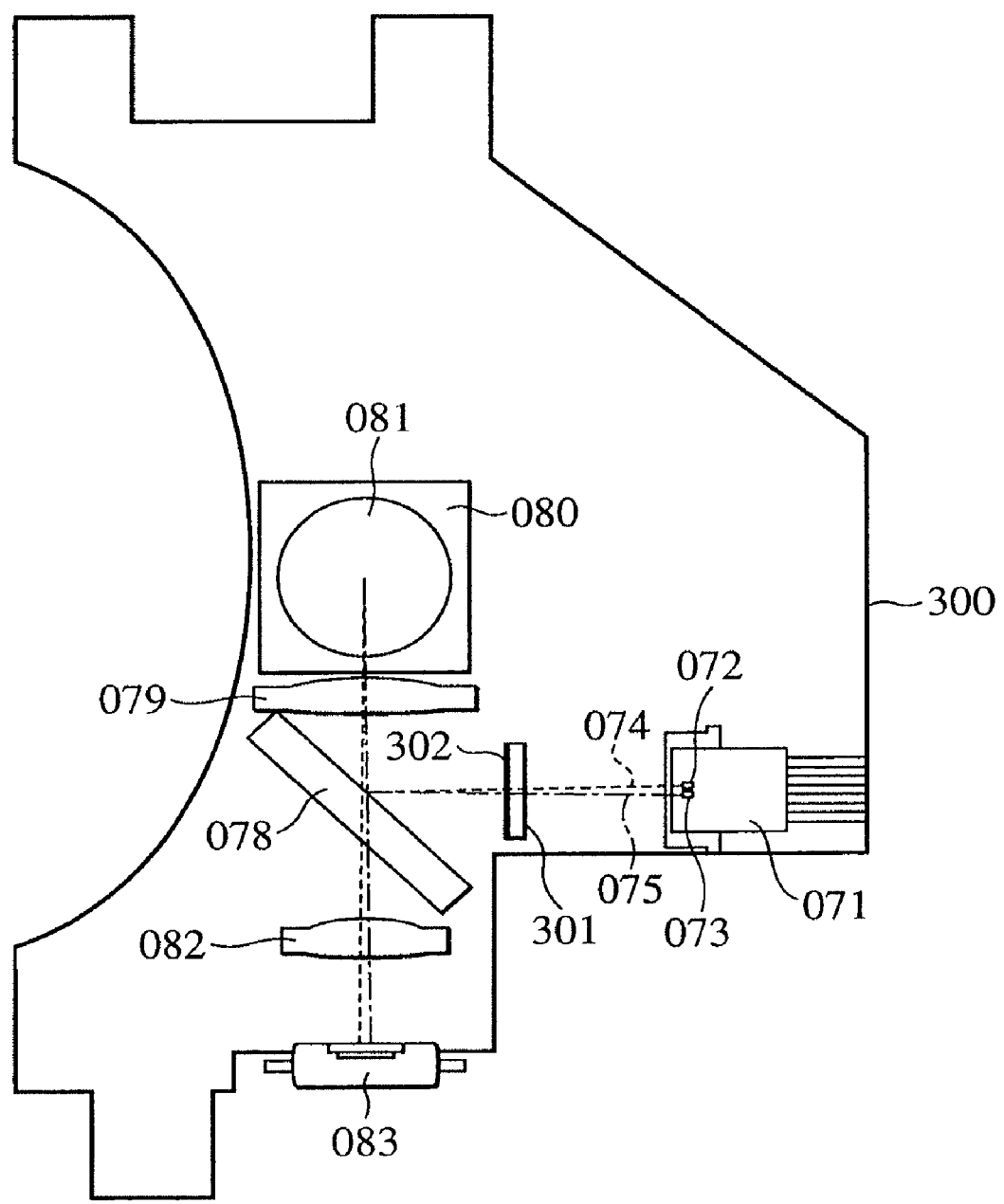
FIG. 15 illustrates a schematic construction of an optical pickup according to a ninth embodiment of the present invention.

In a ninth embodiment a description will be given about a modification of the optical pickup described in the second embodiment. FIG. 15 illustrates the construction of an optical system in an optical pickup 300. The optical pickup 300 carries thereon a diffraction grating 301 of a construction different from that of the diffraction grating 060 in the optical pickup 070 of the second embodiment.

Like the diffraction grating 060, the diffraction grating 301 has a function of splitting a light beam and the split light beams are used in generating a tracking error signal by DPP. However, although the diffraction grating 060 has two grating surfaces, i.e., a DVD grating pattern 076 and a CD grating pattern 077, while the diffraction grating 301 has only one grating surface, i.e., a grating pattern 302 common to both a DVD and a CD. In this point the diffraction grating 301 is different from the diffraction grating 060.

There are various types of optical discs and optical disc recording is generally such that a large quantity of light is directed to an optical disc for changing the composition of an area irradiated with light. For high-speed recording to an optical disc it is necessary to emit a larger quantity of light to the optical disc. Recently, multi-layer optical discs are also available on the market, requiring emission of a larger quantity of light to the discs. Generally, the quantity of light to be directed to an optical disc is determined by the product of the quantity of light emitted from a laser light source, as well as the transmission efficiency of optical parts disposed between the laser light source and the optical disc, and the coupling efficiency of an objective lens. Thus, the transmission efficiency of the optical parts must be made larger.

In the case where two grating surfaces free of wavelength selectivity are present, a light beam is diffracted in each of the two grating surfaces, so that a decrease in the quantity of light of a main light beam (0-order diffracted light which contributes to recording to an optical disc) is large and the transmission efficiency is small. That is, it becomes impossible to transfer a sufficient quantity of light to the optical disc. In view of this point, by imparting wavelength selectivity to each of the two grating surfaces and thereby minimizing the occurrence of a disturbance light beam, it is possible to attain a transmission efficiency equal to that in the conventional optical pickup. For this reason, reference has been made in the third embodiment to an example of using a diffraction grating having wavelength selectivity. However, since the element having wavelength selectivity is provided with two grating surfaces, the diffraction grating manufacturing process becomes long and it is difficult to attain the reduction of cost. By providing one grating surface as in the diffraction grating 301 of the optical pickup 300, it is possible to attain a simple diffraction grating high in transmission efficiency as in the prior art and capable of attaining the reduction of cost. Of course, if the diffraction grating 301 is used without any improvement, it is impossible to effect DPP in both the DVD and CD. The following description is now made of the grating pattern 302 common to both a DVD and a CD.

Figure 16A:
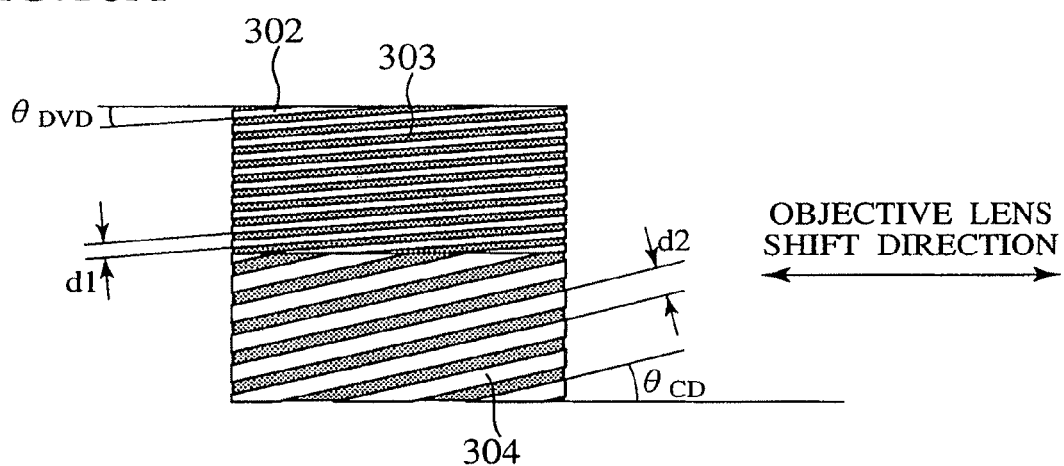
FIGS. 16A and 16B schematically illustrate a grating pattern of a diffraction grating and light beams split by the diffraction grating in the ninth embodiment.
Figure 16B:
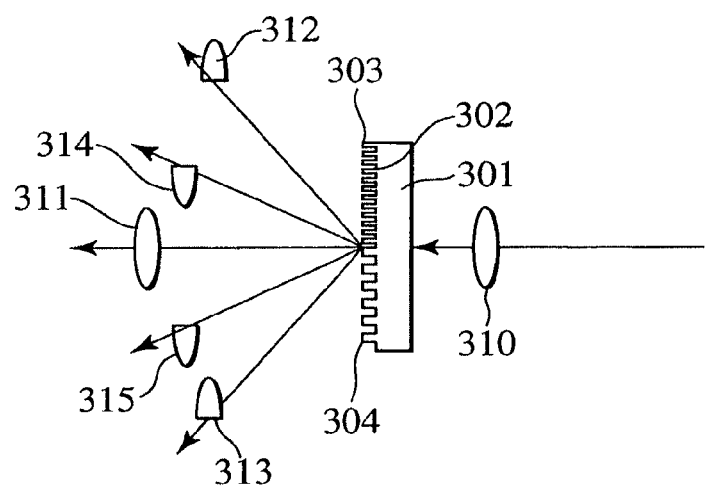

FIG. 16 illustrates the grating pattern 302 common to both a DVD and a CD. FIG. 16A is a schematic diagram showing the construction of the common grating pattern 302 and FIG. 16B is a schematic diagram showing light beams split upon incidence of a light beam on the common grating pattern 302.

First, with reference to FIG. 16A, a description will be given of the construction of the common grating pattern 302. The common grating pattern 302 is divided into two areas which are a DVD optimum pattern 303 and a CD optimum pattern 304. The DVD optimum pattern 303 has the same grating pitch d1 and angle $\theta_{DVD}$ as those of the DVD grating surface 076 and the CD optimum pattern 304 has the same grating pitch d2 and angle $\theta_{CD}$ as those of the CD grating surface 077. It is preferable that the boundary between the DVD optimum pattern 303 and the CD optimum pattern 304 be made coincident with an objective lens shift direction. By so doing, it becomes possible to generate a tracking error signal (push-pull signal) and it is also possible to obtain an effect that detected signal variations at the time of shifting an objective lens can be suppressed.

Next, with reference to FIG. 16B, a description will be given of a light beam incident on the diffraction grating 301 and a light beam outputted from the same diffraction grating. The center of an incident light beam 310 is put in alignment with the boundary between the DVD optimum pattern 303 and the CD optimum pattern 304. This is because the amplitudes of tracking error signals in a DVD and a CD can be well-balanced. The incident light beam 310 is split into a light beam 311 as 0-order diffracted light passing the grating without being diffracted, a light beam 312 as + first-order diffracted light and a light beam 313 as − first-order diffracted light both incident on the DVD optimum pattern 303, a light beam 314 as + first-order diffracted light and a light beam 315 as − first-order diffracted light both incident on the CD optimum pattern 304. The reason why the light beams 312, 313, 314 and 315 are each smaller in size than the light beam 311 is that a single grating surface has two patterns like the common grating pattern 302. Further, the reason why the light beams 312 and 313 split by the DVD optimum pattern 303 travel in a large angle direction relative to the traveling direction of the light beam 311 is that the grating pitch d1 of the DVD optimum pattern 303 is narrow.

Figure 17:
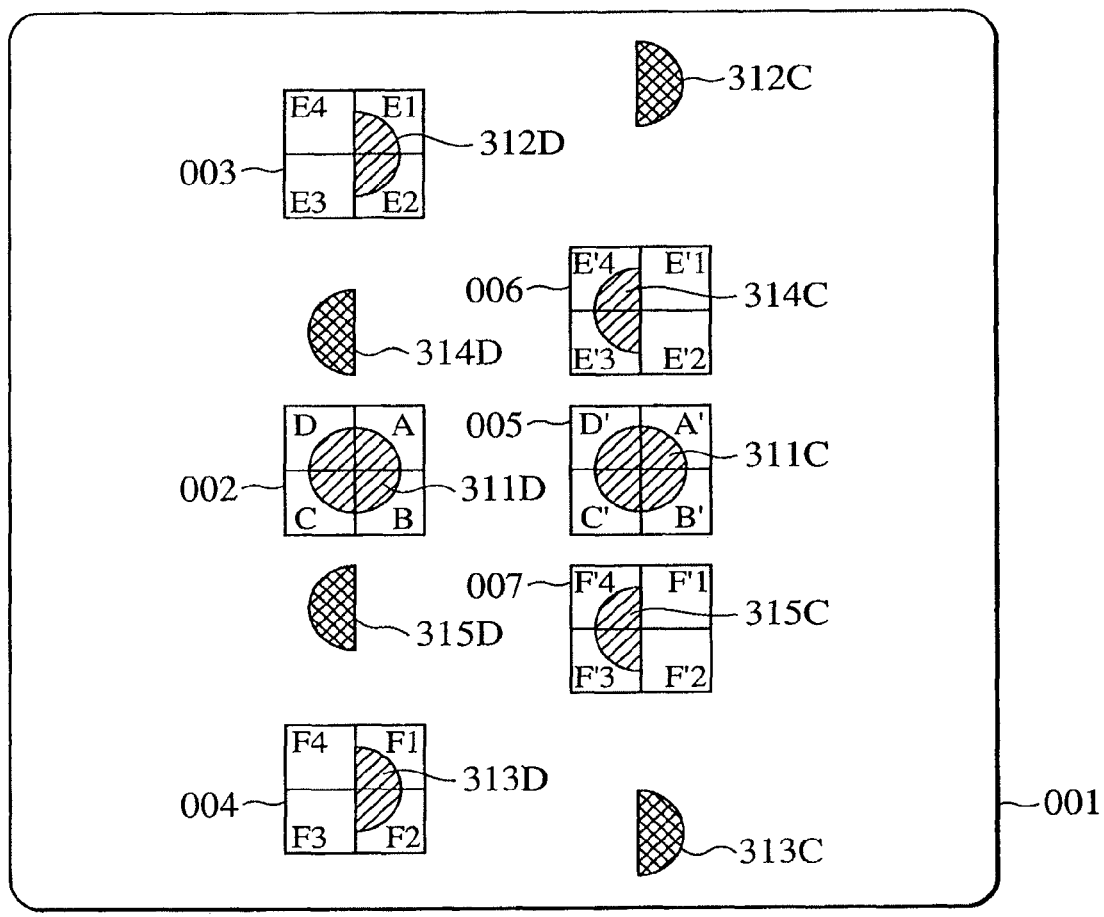
FIG. 17 illustrates the layout relationship of light beams radiated onto a photodetector in the ninth embodiment.

FIG. 17 schematically illustrates light beams directed to the photodetector 001 in the optical pickup 300.

Upon incidence of a DVD light beam on the diffraction grating 301, as described above in connection with FIG. 16B, the light beam is split into DVD main light beam 311D (corresponding to the light beam 311), DVD sub-light beams 312D (corresponding to the light beam 312) and 313D (corresponding to the light beam 313), and DVD disturbance light beams 314D (corresponding to the light beam 314) and 315D (corresponding to the light beam 315). At this time, the DVD main light beam 311D is directed to a detection area 002, the DVD sub-light beam 312D is directed to a detection area 003, and the DVD sub-light beam 313D is directed to a detection area 004, while the DVD disturbance light beams 314D and 315D are prevented from being received by the photodetector.

Likewise, upon incidence of a CD light beam on the diffraction grating 301, the light beam is split into CD main light beam 311C (corresponding to the light beam 311), CD sub-light beams 314C (corresponding to the light beam 314) and 315C (corresponding to the light beam 315), and CD disturbance light beams 312C (corresponding to the light beam 312) and 313C (corresponding to the light beam 313). At this time, the CD main light beam 311C is directed to a detection area 005, the CD sub-light beam 314C is directed to a detection area 006, and the CD sub-light beam 315C is directed to a detection area 007. Further, the CD disturbance light beam 312C is prevented from being received by the photodetector.

When reference is made to the DVD sub-light beam 312D as an example, it is seen that division is made to detection surfaces E1+E4 and E2+E3. In order generate a tracking error signal (especially a push-pull signal) it is necessary to use a differential output between the detection surfaces E1+E4 and E2+E3 as in the foregoing equations (5) and (6). Therefore, the boundary between the DVD optimum pattern 303 and the CD optimum pattern 304 is aligned with the objective lens shift direction so that division is made like the detection surfaces E1+E4 and E2+E3. The diffraction grating is divided vertically in the figure, while the sub-light beams on the photodetector are divided right and left. This is because astigmatism is used for detecting a focusing error signal.

As noted above, the boundary between the DVD optimum pattern 303 and the CD optimum pattern 304 is aligned with the objective lens shift direction so that the DVD sub-light beams 312D, 313D and the CD sub-light beams 314C, 315C can generate a tracking error signal (push-pull signal).

The DVD sub-light beam 312D and the CD sub-light beam 314C are symmetric in the figure. This is because the center of the incident light beam 310 and the boundary between the DVD optimum pattern 303 and the CD optimum pattern 304 are made coincident with each other. For example, when the center of the incident light beam 310 is deviated to the side of the DVD optimum pattern 303, the CD sub-light beam 314C on the photodetector becomes smaller and conversely the DVD sub-light beam 312D becomes larger. For example, when the CD sub-light beam 314C becomes smaller, so does the amplitude of the CD tracking error signal. Conversely, the amplitude of the DVD tracking error signal becomes larger. Therefore, by making the DVD optimum pattern 303 and the CD optimum pattern 304 coincident with respect to the boundary, the DVD sub-light beam 312D and the CD sub-light beam 314C can be made symmetric and the amplitudes of both DVD and CD tracking error signals can be well-balanced.

By thus improving the diffraction grating as in FIG. 16A, with only one grating surface, it is possible to attain an optimal DPP in each of the DVD and CD. As a matter of course, in a case of using such a diffraction grating as shown in FIG. 16A, it is necessary to use such a photodetector as shown in FIG. 1 so as to prevent overlapping of a disturbance light beam with a sub-light beam on the photodetector.

In such a DVD/CD common grating pattern as shown in FIG. 16A, since only one grating surface is present, it is possible to attain transmission efficiency almost equal to that of the diffraction grating provided with two grating surfaces having wavelength selectivity.

Because of a single grating surface, the fabrication of the diffraction grating is easy and the reduction of cost can be attained.

Tenth Embodiment

Figure 18:
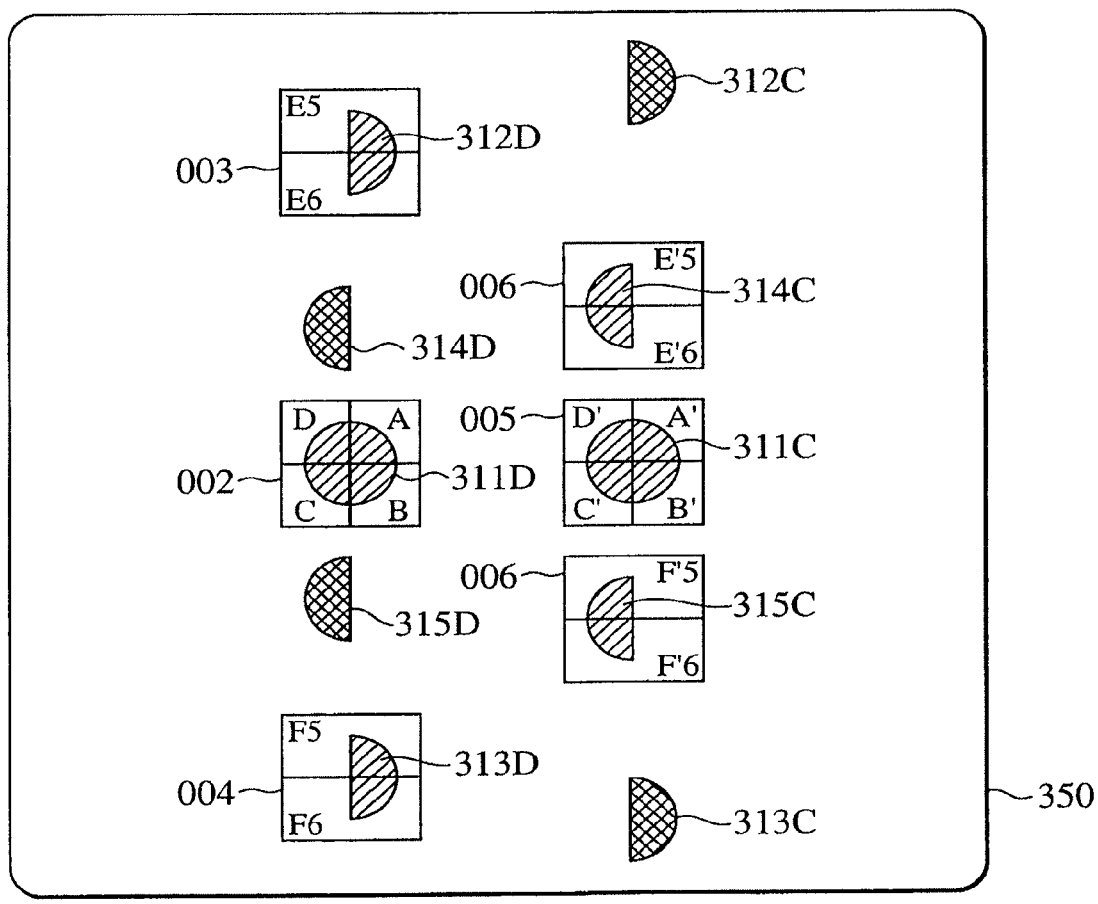
FIG. 18 illustrates a schematic construction of a photodetector according to a tenth embodiment of the present invention.

According to a tenth embodiment a description will be given of a modification of the photodetector 001 described in the first and ninth embodiments. FIG. 18 schematically illustrates a photodetector 350. The photodetector 350 has detection surfaces of detection areas 003, 004, 005 and 006 different from those of the photodetector 001.

Each detection area is divided in two. A detection area 002 has detection surfaces E5 and E6, a detection area 003 has detection surfaces F5 and F6, a detection area 005 has detection surfaces E'5 and E'6, and a detection area 006 has detection surfaces F'5 and F'6. For the detection areas 003 and 004, as in the ninth embodiment, a DVD sub-light beam 312D is directed to the detection area 003 and a DVD sub-light beam 313D is directed to the detection area 004. At this time, DVD disturbance light beams 314D and 315D are not received by the photodetector.

Also for the detection areas 005 and 006, as in the ninth embodiment, a CD sub-light beam 314C is directed to the detection area 005 and a CD sub-light beam 315C is directed to the detection area 006. At this time, CD disturbance light beams 312C and 313C are not received by the photodetector.

The optical pickup assumes the adoption of DPP for generation of a tracking error signal and the astigmatic method for generation of a focusing error signal. In this optical pickup, the sub-light beam receiving area is used only for generation of a tracking error signal (push-pull signal). Therefor, the sub-light beam receiving area needs only to be divided in two in a direction (the vertical direction in the figure) which permits detection of a tracking error signal (push-pull signal) from a sub-light beam. Thus, the detection areas 002, 003, 005 and 006 are each of a mere bisected construction of its detection surface. Of course, unless a disturbance light beam is devised not to enter each detection area as in FIG. 18, it will become impossible to generate a stable tracking error signal and a focusing error signal. Detected signals can be obtained in accordance with the following equations (15) to (18):

$$\text{DVD focusing error signal} = [(A+C)-(B+D)] \quad (15)$$

$$\text{CD focusing error signal} = [(A'+C')-(B'+D')] \quad (16)$$

$$\text{DVD tracking error signal} = [(A+D)-(B+C)] - k \times [(E5-E6)] + [(F5-F6)] \quad (17)$$

$$\text{CD tracking error signal} = [(A'+D')-(B'+C')] - k' \times [(E'5-E'6)] + [(F'5-F'6)] \quad (18)$$

where k and k' stand for coefficients for correcting a light quantity ratio between main and sub-light beams. Unlike the first embodiment, the light quantity of the sub-light beam 312D is about half of that of the sub-light beam 003 and therefore the magnitude of k is different from that in the first embodiment.

By using such a photodetector 350 as in the eighteenth embodiment it is possible to make the number of divided detection areas smaller than in the use of the photodetector 001, so that the internal connection is made simpler and it is possible to implement a photodetector easy to be fabricated.

How to generate a required focusing error signal and a tracking error signal differ depending on the optical disc used. However, the division of detection areas may be done as desired as is the case with the photodetector 350 insofar as the detection areas are arranged so as to prevent entry of a disturbance light beam into the detection areas as in the photodetector 001.

Eleventh Embodiment

In an eleventh embodiment a description will be given of modifications of the diffraction grating described in the ninth embodiment. FIGS. 19A to 19D illustrate various modifications of the DVD/CD common grating pattern in the diffraction grating 301.

Figure 19A:
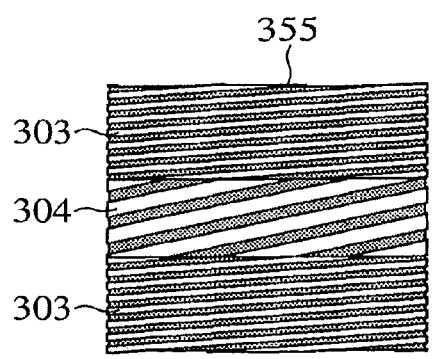
FIGS. 19A to 19D illustrate grating patterns of a diffraction grating according to an eleventh embodiment of the present invention.

FIG. 19A illustrates a grating pattern 355 common to both a DVD and a CD. Like the common grating pattern 302, the common grating pattern 355 is also of a single grating surface construction, but is different from the common grating pattern 302 in that a CD optimum pattern 304 is sandwiched in between DVD optimum patterns 303. It is preferable that the center of the CD optimum pattern 304 and that of an incident light beam be aligned with each other and that the boundaries between the CD optimum pattern 304 and the DVD optimum patterns 303 be made coincident with the objective lens shift direction.

The use of the DVD/CD common grating pattern 355 can afford an effect that the feedthrough of a tracking error signal into a focusing error signal in the differential astigmatic method can be minimized.

More specifically, both first grating pattern areas formed with first grating patterns and a second grating pattern area formed with a second grating pattern are disposed within a single plane and the second grating pattern area is disposed between the first grating pattern areas. Thus, an effect is provided of minimizing feedthrough of a tracking error signal to a focusing error signal when the differential astigmatic method is used.

Figure 19B:
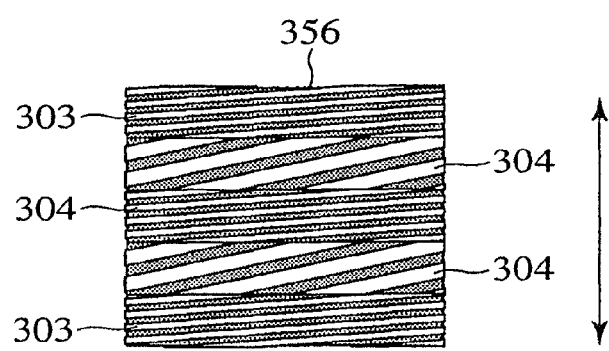

FIG. 19B illustrates a grating pattern 356 common to both a DVD and a CD. The common grating pattern 356 is also of a single grating surface like the common pattern 302, but is different from the common grating pattern 302 in that CD optimum patterns 304 and DVD optimum patterns 303 are arranged in an alternate manner. If plural patterns are thus arranged on a single grating surface, it is no longer required to make alignment between the center of an incident light beam and the center of the diffraction grating in the arrowed direction. By thus increasing the number of areas, the light quantity of a diffracted light beam can be averaged and therefore a mounting adjustment in the arrowed direction of the diffraction grating becomes unnecessary. That is, the optical pickup can be fabricated easily. Although divided into five in the arrowed direction in FIG. 19B, the grating pattern 356 may be divided into four or six.

Figure 19C:
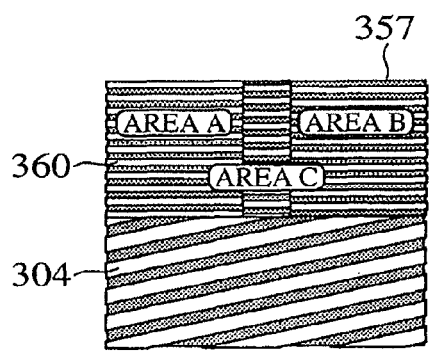

FIG. 19C illustrates a grating pattern 357 common to both a DVD and a CD. The common grating pattern 357 is also of a single grating surface construction like the common grating pattern 302, but is different from the common grating pattern 302 in that a DVD optimum pattern 360 different from the DVD optimum pattern 303 is disposed. The DVD optimum pattern 360 is the same grating pattern as the DVD grating pattern 099 and permits the adoption of a phase difference DPP method for generation of a DVD tracking error signal. That is, since the phase difference DPP method is employable for detection of a tracking error signal, it is possible to be compatible with a super multi-type optical disc apparatus.

Figure 19D:
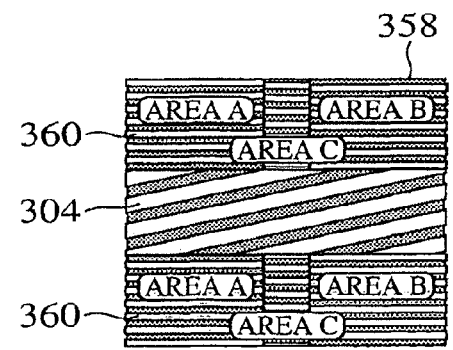

FIG. 19D illustrates a grating pattern 358 common to both a DVD and a CD. The common grating pattern 358 is also of a single grating surface construction like the common grating pattern 357, but is different from the common grating pattern 357 in that a CD optimum pattern 304 is sandwiched in between DVD optimum patterns 360. It is preferable that the center of the CD optimum pattern 304 and that of an incident light beam be aligned with each other and that the boundaries of the CD optimum pattern 304 and the DVD optimum pattern 360 be made coincident with the objective lens shift direction.

By using the common grating pattern 358 it is possible to obtain an effect that the feedthrough of a tracking error signal into a focusing error signal in the differential astigmatic method can be suppressed. Besides, the use of the DVD optimum pattern 360 permits the adoption of the phase difference DPP for detection of a tracking error signal and it becomes possible to be compatible with a super multi-type optical disc apparatus.

More specifically, in the optical pickup which carries thereon the diffraction grating of the common grating pattern 358 shown in FIG. 19D, the DVD/CD super multi-type can be handled and it is possible to let a main light beam be directed to an optical disc with high efficiency; besides, a feedthrough suppressing effect can be provided in the differential astigmatic method.

When the DVD optimum patterns 304, 360 and CD optimum pattern 304 shown in FIGS. 19A to 19D are arranged on a single grating surface, the grating surface is divided equally; however, the width may be set arbitrarily such as, for example, the width of the CD optimum pattern 304 being wide and that of the DVD optimum pattern 360 narrow.

Preferably, the grating pitch d1 of the diffraction grating is set at about one half of the grating pitch d2. This is for the following reason. The disturbance light beam 020 on the photodetector is positioned just midway between the detection areas 002 and 003 and the disturbance light beam 021 is positioned just midway between the detection areas 002 and 004; therefore, an effect can be provided that it is most difficult for the disturbance light beams to enter the detection areas even if the objective lens shift is taken into account.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. An optical pickup including a photo-detector to detect a light beam and a diffraction grating to split the light beam, the photo-detector comprising:
    a first light receiving area to receive the light beam emitted from a laser light source of a first wavelength and split by first and second diffraction grating pattern areas of the diffraction grating; and
    a second light receiving area to receive the light beam emitted from a laser light source of a second wavelength longer than said first wavelength and split by the first and second diffraction grating pattern areas of the diffraction grating;
    wherein said first light receiving area is disposed at a position where, when the light beam is emitted from said laser light source of the first wavelength, the light beam split by said first diffraction grating pattern area enters the first light receiving area and the light beam split by said second diffraction grating pattern area does not enter the first light receiving area,
    wherein said second light receiving area is disposed at a position where, when the light beam is emitted from said laser light source of the second wavelength, the light beam split by said first diffraction grating pattern area does not enter the second light receiving area and the light beam split by said second diffraction grating pattern area enters the second light receiving area, and
    the diffraction grating comprising said first and second diffraction grating pattern areas disposed at a same plane of the diffraction grating.

2. An optical pickup including a photo-detector to detect a light beam and a diffraction grating to split the light beam, the photo-detector comprising:
    a first light receiving area to receive the light beam emitted from a laser light source of a first wavelength and spilt by first and second diffraction grating pattern areas of the diffraction grating; and
    a second light receiving area to receive the light beam emitted from a laser light source of a second wavelength longer than said first wavelength and split by the first and second diffraction grating pattern areas of the diffraction grating;
    wherein said first light receiving area is disposed at a position where, when the light beam is emitted from said laser light source of the first wavelength, the light beam split by said first diffraction grating pattern area enters the first light receiving area and the light beam split by said second diffraction grating pattern area does not enter the first light receiving area; and
    wherein said second light receiving area is disposed at a position where, when the light beam is emitted from said laser light source of the second wavelength, the light beam split by said first diffraction grating pattern area does not enter the second light receiving area and the light beam split by said second diffraction grating pattern area enters the second light receiving area, and
    the diffraction grating comprising said first and second diffraction grating pattern areas with said second diffraction grating pattern area being arranged in said first diffraction grating pattern area.

3. An optical pickup according to claim 1, wherein the light beams split by said first and second diffraction grating pattern areas are each first-order diffracted light of the light beam.

4. An optical pickup according to claim 1, wherein:
    said first light receiving area is disposed at a position where 0-order diffracted light and first-order diffracted light of the light beam of said first wavelength split by said first diffraction grating pattern area are received and first-order diffracted light split by said second diffraction grating pattern area is not received, and
    said second light receiving area is disposed at a position where 0-order diffracted light and first-order diffracted light of the light beam of said second wavelength split by said second diffraction grating pattern area are received and first-order diffracted light split by said first diffraction grating pattern area is not received.

5. An optical pickup according to claim 1, wherein:
    said first light receiving area comprises one light receiving area to receive 0-order diffracted light of the light beam of said first wavelength and two light receiving areas to receive first-order diffracted light of the light beam, said two light receiving areas to receive said first-order diffracted light being each disposed at a position that first-order diffracted light of the light beam of said second wavelength does not enter, and
    said second light receiving area comprises one light receiving area to receive 0-order diffracted light of the light beam of said second wavelength and two light receiving areas to receive first-order diffracted light of the light beam, said two light receiving areas to receive said first-order diffracted light being each disposed at a position that first-order diffracted light of said first wavelength does not enter.

6. An optical pickup including a photo-detector to detect a light beam and a diffraction grating to split the light beam, the photo-detector comprising:
    a first light receiving area to receive one light beam as 0-order diffracted light out of at least three light beams resulting from splitting of the light beam emitted from a laser light source of a first wavelength and subsequent reflection by a first optical information recording medium;

second and third light receiving areas each adapted to receive two light beams as first-order diffracted light out of the light beams reflected by said first optical information recording medium;

a fourth light receiving area to receive one light beam as 0-order diffracted light beam out of at least three light beams resulting from splitting of the light beam emitted from a laser light source of a second wavelength longer than said first wavelength and subsequent reflection by a second optical information recording medium; and fifth and sixth light receiving areas each adapted to receive two light beams as first-order diffracted light out of the light beams reflected by said second optical information recording medium, wherein a distance from said second light receiving area to said third light receiving area is longer than a distance from said fifth light receiving area to said sixth light receiving area;

the diffraction grating comprising first and second diffraction grating pattern areas disposed at a same plane of the diffraction grating, wherein the light beam of the first wavelength diffracted by said second diffraction grating pattern area is directed to an area located between said first and second light receiving areas and also to an area located between said first and third light receiving areas.

7. An optical pickup including a photo-detector to detect a light beam and a diffraction grating to split the light beam, the photo-detector comprising:

a first light receiving area to receive one light beam as 0-order diffracted light out of at least three light beams resulting from splitting of the light beam emitted from a laser light source of a first wavelength and subsequent reflection by a first optical information recording medium;

second and third light receiving areas each adapted to receive two light beams as first-order diffracted light out of the light beams reflected by said first optical information recording medium;

a fourth light receiving area to receive one light beam as 0-order diffracted light beam out of at least three light beams resulting from splitting of the light beam emitted from a laser light source of a second wavelength longer than said first wavelength and subsequent reflection by a second optical information recording medium; and fifth and sixth light receiving areas each adapted to receive two light beams as first-order diffracted light out of the light beams reflected by said second optical information recording medium, wherein a distance from said second light receiving area to said third light receiving area is longer than a distance from said fifth light receiving area to said sixth light receiving area;

the diffraction grating comprising said first and second diffraction grating pattern areas, and said second diffraction grating pattern area is arranged in said first diffraction grating pattern area, wherein the light beam of the first wavelength diffracted by said second diffraction grating pattern area is directed to an area located between said first and second light receiving areas and also to an area located between said first and third light receiving areas.

8. An optical pickup including a photo-detector to detect a light beam and a diffraction grating to split the light beam, the photo-detector comprising:

a first light receiving area to receive one light beam as 0-order diffracted light out of at least three light beams resulting from splitting of the light beam emitted from a laser light source of a first wavelength and subsequent reflection by a first optical information recording medium;

second and third light receiving areas each adapted to receive two light beams as first-order diffracted light out of the light beams reflected by said first optical information recording medium;

a fourth light receiving area to receive one light beam as 0-order diffracted light beam out of at least three light beams resulting from splitting of the light beam emitted from a laser light source of a second wavelength longer than said first wavelength and subsequent reflection by a second optical information recording medium; and fifth and sixth light receiving areas each adapted to receive two light beams as first-order diffracted light out of the light beams reflected by said second optical information recording medium, wherein a distance from said second light receiving area to said third light receiving area is longer than a distance from said fifth light receiving area to said sixth light receiving area;

the diffraction grating comprising first and second diffraction grating pattern areas disposed at a same plane of the diffraction grating, wherein the light beam of the second wavelength diffracted by said first diffraction grating pattern area is directed to an area located outside said fifth light receiving area with respect to said fourth light receiving area and also to an area located outside said sixth light receiving area with respect to said fourth light receiving area.

9. An optical pickup including a photo-detector to detect a light beam and a diffraction grating to split the light beam, the photo-detector comprising:

a first light receiving area to receive one light beam as 0-order diffracted light out of at least three light beams resulting from splitting of the light beam emitted from a laser light source of a first wavelength and subsequent reflection by a first optical information recording medium;

second and third light receiving areas each adapted to receive two light beams as first-order diffracted light out of the light beams reflected by said first optical information recording medium;

a fourth light receiving area to receive one light beam as 0-order diffracted light beam out of at least three light beams resulting from splitting of the light beam emitted from a laser light source of a second wavelength longer than said first wavelength and subsequent reflection by a second optical information recording medium; and fifth and sixth light receiving areas each adapted to receive two light beams as first-order diffracted light out of the light beams reflected by said second optical information recording medium;

wherein a distance from said second light receiving area to said third light receiving area is longer than a distance from said fifth light receiving area to said sixth light receiving area;

the diffraction grating comprising said first and second diffraction grating pattern areas, and said second diffraction grating pattern area is arranged in said first diffraction grating pattern area, wherein the light beam of the second wavelength diffracted by said first diffraction grating pattern area is directed to an area located outside said fifth light receiving area with respect to said fourth light receiving area and also to an area located outside said sixth light receiving area with respect to said fourth light receiving area.

10. An optical pickup according to claim 6, further comprising objection lenses to condense the light beam, wherein a direction of a boundary plane between said first diffraction grating pattern area and said second diffraction grating pattern area is parallel to shifting direction of the objection lenses.

11. An optical pickup according to claim 10, wherein the light beams of the first and second wavelength area respectively emitted from the laser light sources of the first and second wavelength disposed on a same laser-chip.

* * * * *